INVENTOR
Heinz Leiber

BY Spencer & Kaye
ATTORNEYS

INVENTOR
Heinz Leiber

INVENTOR
Heinz Leiber

BY Spencer & Kaye
ATTORNEYS.

INVENTOR
Heinz Leiber

Jan. 19, 1971 H. LEIBER 3,556,610
BRAKE CONTROL SYSTEM FOR PREVENTING WHEEL LOCKING
Filed Oct. 28, 1968 10 Sheets-Sheet 10

INVENTOR
Heinz Leiber

BY Spencer & Kaye
ATTORNEYS.

United States Patent Office 3,556,610
Patented Jan. 19, 1971

3,556,610
BRAKE CONTROL SYSTEM FOR PREVENTING
WHEEL LOCKING
Heinz Leiber, Leimen, Germany, assignor to Teldix
GmbH, Heidelberg, Germany
Filed Oct. 28, 1968, Ser. No. 771,079
Claims priority, application Germany, Oct. 28, 1967,
T 35,141
Int. Cl. B60t 8/08
U.S. Cl. 303—21                                    12 Claims

ABSTRACT OF THE DISCLOSURE

A brake control system, suitable for use with a vehicle having brakes actuated by a pressure medium for preventing the wheels of the vehicle from locking. In addition to the usual means for braking the wheels of the vehicle, the brake control system includes means, connected to sense the rotation of each wheel, for producing an output signal when the rotational deceleration of a particular wheel exceeds a given threshold value. The control system also has means, connected to receive this output signal, for reducing the braking force that is applied to the particular wheel a prescribed delay time after receipt of the output signal.

CROSS-REFERENCE TO RELATED APPLICATIONS

The subject matter of this application is related to that disclosed in the following copending applications: Ser. No. 683,236, filed Nov. 15, 1967, of Heinz Leiber; Ser. No. 686,492, filed Nov. 29, 1967, of Heinz Leiber, now Pat. No. 3,498,683; Ser. No. 707,032, filed Feb. 21, 1968, of Heinz Leiber, now Pat. No. 3,467,444.

BACKGROUND OF THE INVENTION

The present invention relates to a brake control system for preventing wheel locking which is suitable for vehicles having fluid-actuated brakes.

Various types of hydraulic or air brake control systems for preventing vehicle wheels from locking are known in the art. The most significant components of such systems are a brake pressure control unit and a signalling unit which monitors the movements of each wheel being braked. The pressure control unit, which is also called a pressure modulator, serves to change the brake pressure applied to each wheel independently of the driver-initiated brake action. The brake pressure control unit is responsive to electrical signals produced by the signalling unit. This signalling unit, which is also called a sensor, generates the signals in dependence upon the rotational state of each braked wheel.

The present invention relates, in particular, to a brake control system of the type having a sensor which produces a signal whenever the rotational deceleration of a monitored wheel exceeds a certain limiting or threshold value. The brake pressure control unit then reduces the brake pressure applied to this wheel in response to the presence of this rotational deceleration signal.

Many of the known, mostly older, systems of the type to which the present invention relates, have the disadvantage that they operate too slowly. They bring about a reduction in the brake pressure applied to a wheel only after the wheel has so sharply decelerated that it can no longer be prevented from locking. Newer, more sensitive systems have therefore been developed which respond immediately to rotational decelerations; that is, when the rotational deceleration of a wheel falls below the threshold value, the sensor passes a signal to the pressure control unit which directly initiates a reduction in pressure.

Even under normal driving conditions, however, the wheels of a vehicle will experience momentary rotational decelerations which can in no way be considered an indication that the wheels are in iminent danger of locking. Such momentary rotational decelerations may be created, for example, when the vehicle is driven over bumps. These decelerations also result from rotational oscillations caused by play or torque in the drive elements of the wheel which, in some cases, also cooperate with the elasticity of the tire.

It is not desirable that an anti-skid brake control system respond to such momentary rotational decelerations to reduce the applied brake pressure because this would unnecessarily lengthen the stopping distance of the vehicle. In brake control systems which accomplish the reduction in brake pressure by removing or discharging a portion of the supply of pressure medium, the response to momentary rotational decelerations also results in an unnecessary loss of pressure medium.

In certain cases, the known and earlier-proposed brake control systems are even actuated in the absence of wheel decelerations as a result of malfunctions of the sensor or unevenness in the signal produced. To borrow an expression used in the electronics art, this phenomenon may be considered "noise" in the rotational deceleration signal. Resonance phenomena of either mechanical or electrical origin within the signal-generating unit can also temporarily cause increases in the rotational deceleration signal and result in untimely reductions in the brake pressure applied to a vehicle wheel.

To further explain the difficulties associated with highly sensitive anti-skid brake control systems, reference is made to FIG. 1 which illustrates the operation of an earlier-proposed so-called "three point system." This system, which will be described in detail below in connection with FIG. 3, provides an inlet valve and an outlet valve for the pressure medium applied to each wheel to be braked. The system knows three states or valve position combinations: (1) inlet valve open and outlet valve closed (pressure rising); (2) inlet valve and outlet valve closed (pressure constant); and (3) inlet valve closed and outlet valve open (pressure falling). The signalling unit which is employed has two actuation thresholds: one with reference to the rotational deceleration and the other with reference to the rotational acceleration of each braked wheel. If a wheel exceeds the actuation threshold of rotational deceleration, the pressure applied to it falls until the wheel accelerates sufficiently to reach the corresponding threshold of rotational acceleration. The pressure then remains constant while the rotational speed of the wheel approaches the speed of the vehicle and finally rises again when the wheel's rotational acceleration falls below the acceleration threshold value.

These occurrences are charted with respect to time in FIG. 1. The curve $V_V$ represents the speed of the vehicle, $V_W$ the actual circumferential speed of a braked wheel, $V_W^*$ the optimum circumferential speed of the wheel and P the regulated brake pressure. In the case of the optimum circumferential speed of the wheel $V_W^*$, there is assumed an exemplary speed which is a constant 85% of the speed of the vehicle $V_V$. This figure is based on the simplifying precept that, during the interval under consideration, the maximum friction between the wheel and the road will occure with a very definite and unchanging wheel slip given by $$s = \frac{V_v - V_w}{V_v} \cdot 100 \approx 15\%$$

In reality, however, this is not an accurate assumption as will be explained in further detail below.

The normal control cycle of the brake control system is shown in the left-hand portion of FIG. 1. The velocity of the wheel corresponds, at first, to the optimum speed $V_w^*$ which, according to the above assumption, gives the highest possible braking effect. At time $t_1$ the wheel breaks loose (begins to lock) and quickly exceeds the threshold of rotational deceleration. The pressure P is immediately reduced. The wheel then comes under control again and at time $t_2$ its rotational acceleration exceeds the acceleration threshold. From this point on, the brake pressure is held constant until, at time $t_3$, the acceleration of the wheel falls below the acceleration threshold and the pressure begins to rise.

Normally it should be expected that the brake pressure P would increase to the value prescribed by the driver of the vehicle or, if that value were too high, until there occurred a further control cycle of the same type. It has been shown, however, that a momentary and relatively strong deceleration of the wheel at this time—the responsive signal of which might possibly have been exaggerated or otherwise falsified by the sensor—can cause the system to oscillate. This is illustrated in the right half of FIG. 1. The rotational deceleration initiates a pressure reduction at time $t_4$. However, the wheel is again immediately and strongly accelerated, this time past the optimum velocity. The reduction in pressure ceases at time $t_5$, but no pressure build-up can occur until time $t_6$. Shortly thereafter, at time $t_7$, the velocity of the wheel swings back again (slows down) and the pressure is further reduced until time $t_8$. This procedure is repeated for several cycles; in every cycle the reduction in pressure is much greater than the subsequent pressure increase. During this time, the speed of the wheel increases in surges until it reaches the speed of the vehicle; that is, until it reaches the speed of an unbraked wheel and the brake pressure has fallen to zero. Not until this time $t_9$ when the speed $V_w$ equals the speed $V_v$ do the oscillations cease. The brake action can only then be slowly rebuilt again from zero.

SUMMARY OF THE INVENTION

It is an object of the present invention to generally eliminate the above-described difficulties associated with highly sensitive brake control systems for preventing wheel locking and to avoid, in particular, the system oscillations caused by a cascading pressure reduction in the three point control system.

This object, as well as other objects which will become apparent in the discussion that follows, is achieved, according to the present invention, by providing a delay interval between the moment that the sensor produces the output signal indicating that the deceleraion of a wheel has exceeded the deceleration threshold and the moment that the brake pressure applied to the wheel has begun to be reduced. This arrangement thus requires that the rotational deceleration signal remain at a value exceeding the threshold value for a time at least equal to the delay interval before the pressure reduction will occur. Momentary rotational decelerations not lasting as long as the delay interval will not be able to initiate a pressure reduction. The time delay thus effectively filters out the undesired signals so that only the signals actually indicative of imminent locking of a wheel will be effective in the brake control system.

The delay interval can have a fixed value. This can best be achieved with the aid of an electronic timer that is actuated by the rotational deceleration signal and that, after expiration of the delay interval, emits an output signal to initiate the pressure reduction (e.g., by opening the outlet valve). Such timers are well known in the art and must merely be selected to handle the particular type of rotational deceleration electric signal used in the brake control system; i.e., pulse, voltage step, or the like. Advantageously, the timer should also be adjustable so that the delay interval can be adapted to the particular type of brake control system and to the vehicle in which it is used.

Although the introduction of such a permanently set delaw interval between the occurrence of the rotational deceleration signal and the subsequent pressure reduction substantially solves the problem discussed in the introductory paragraphs and has resulted, in practical experiments, in a considerable reduction in vehicle braking distances when compared with vehicles with locked wheels, it is possible that occasionally the following problem will occur:

When the friction between a wheel and the road is suddenly and strongly reduced causing the wheel to be subjected to a heavy and continuous rotational deceleration, it is possible that, due to the delay interval, the pressure reduction will come too late. In a further embodiment of the present invention, it is therefore proposed to make the delay interval variable in such a manner that it will be shorter, the faster the rotational speed of the wheel is reduced. Thus, when the rotational speed is suddenly very much reduced (strong rotational deceleration), the delay interval will be shorter than when the rotational speed decreases relatively slowly (weak rotational deceleration).

This dependence can also be easily electronically realized within the brake control system for preventing wheel blocking. However, if the system is provided with a sensor, driven by each wheel, containing rotatable inertia members and contacts which are actuated thereby, the invention proposes that means be provided to attenuate the relative motion between the rotatable members only in that rotational direction which corresponds to a rotational deceleration of the wheel. This solution is distinguished by its simplicity and operates dependably when, according to a particular embodiment of the invention the attenuation device is an escapement retard mechanism provided with a recoil spring and driven by one rotatable member by a limit stop which is designed to operate in one direction only.

Such an escapement retard mechanism can be so adjusted, with good approximation, that it acts as a kind of integrator for the rotational deceleration. This desirable characteristic has the effect that the delay interval is ended as soon as the associated wheel—at least approximately—reaches a rotational speed which, when compared with the rotational speed thereof at the moment its deceleration exceeds the rotational deceleration threshold, is slower by a certain rotational speed difference $\Delta v$.

It is just as possible to use an electronic integrating element which integrates an electric signal value, that is at least approximately proportional to the rotational deceleration, from the moment that the rotational deceleration signal occurs and which initiates the pressure reduction when a certain integral value has been reached. This is the most accurate way, according to the present invention, to realize a brake control system for preventing wheel locking that has the integration behavior.

The same delay interval-speed dependence can also be achieved, according to the present invention, by a comparison of rotational speeds. For this purpose, it is proposed to store an electrical value when the rotational deceleration signal appears, which value is at least approximately proportional to the rotational speed, and subsequently to continuously perform a comparison between the continuing value of the deceleration signal and the stored value. The reduction in brake pressure is initiated only after the difference between the values has reached a certain measure (corresponding to a certain difference $\Delta v$ rotational speed). In order to emphasize the connection between this comparison of speeds and the original problem, it should be observed that momentary rotational decelerations of the wheel will also, in this case, remain ineffective to reduce the brake pressure as long as they do not reach the speed difference required to actuate the system.

A further, very advantageous modification of the brake control system, according to the present invention, requires that the delay interval be made shorter the shorter the time it is since the previous pressure reduction has occurred. Shortly after a pressure reduction the rotational speed of the wheel is normally considerably below the optimum rotational speed $V_w^*$. If, at this moment, there is a further rotational deceleration which could be caused, for example, by a change in the coefficient of friction of the road, there will be very little time in which to prevent the wheel from locking by reducing the pressure. In this case, therefore, it is desirable that the pressure reduction occur immediately. The more the wheel has "recovered," i.e. the higher its rotational speed has again become, the longer can be the delay interval.

In the anti-skid system mentioned above which employs the escapement retard mechanism together with the wheel-driven rotating members, this particular requirement has already been met. The retard mechanism requires a certain time to return to its original position under the action of its recoil spring. In a normal control cycle the retard mechanism returns during the rotational acceleration phase of the wheel, while the rotating members are in their acceleration position. If the rotational acceleration phase is substantially shortened, however, the rotating members will move to their respective rotational deceleration positions before the retard mechanism has returned. These members are thus not slowed in their relative movement by the retard mechanism and can therefore actuate the electric contacts to initiate the pressure reduction without the intervening full delay.

Finally, in an advantageous refinement of the brake control system, according to the present invention, the device which produces the delay interval is made effective only after the vehicle wheel has reached a second threshold of acceleration subsequent to a reduction in brake pressure, which second threshold value can, under certain circumstances, coincide with the rotational acceleration threshold value mentioned previously. In the last analysis, it is important here that the delay interval of the present invention be effective only when the circumferential speed of the wheel has increased again, possibly up to the optimum speed, after a pressure reduction has terminated. When the anti-skid system is not designed to provide a direct regulation of the speed of the wheel, or of the wheel slippage—and the present invention is based on such a system—the introduction of the proposed second rotational acceleration threshold value is an effective substitute therefor. Only when this threshold value has been exceeded does the delay interval begin to increase from zero to its full value. Then, if the next rotational deceleration signal follows at a long enough interval, the full delay interval will become effective.

The mechanical realization of this idea may be achieved by providing a return stop for the escapement retard mechanism. Such a return stop can consist of a blocking lever operated by cams on one rotatable member. This blocking lever blocks the retard mechanism by mechanical action after the rotatable member reaches an end position as a result of the rotational deceleration of the wheel, and releases the retard mechanism, allowing it to return to its original position, after it attains a position corresponding to the rotational acceleration threshold value.

DESCRIPTION OF THE PREFERRED EMBODIMENTS

Figure 1:
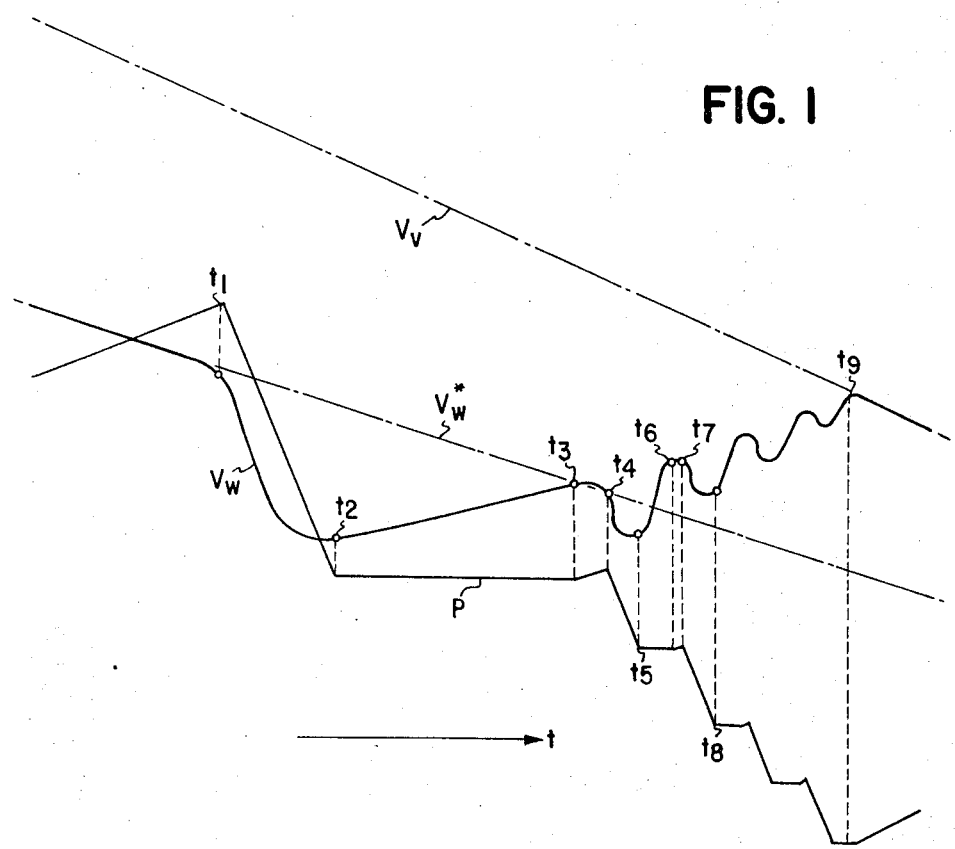
FIG. 1 is a graph showing an exemplary time response of an earlier-proposed brake control system for preventing wheel locking.
Figure 2:
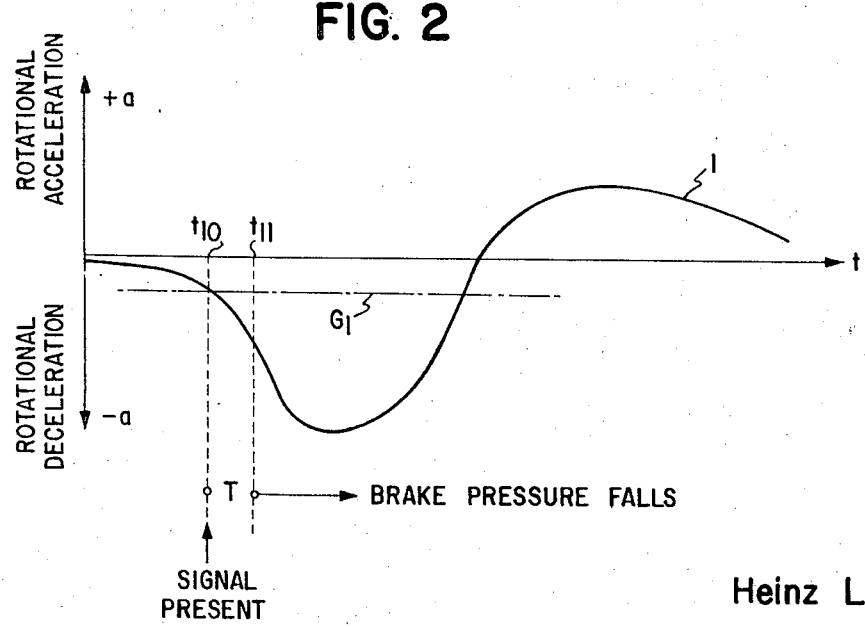
FIG. 2 is a graph showing an exemplary time response of the brake control system according to the present invention.

The preferred embodiments of the present invention will now be described in connection with FIGS. 2–22 of the drawings. Referring first to FIG. 2, which is a graph of the time derivative of the rotational speed of the braked wheel during one operational cycle of the brake control system according to the present invention, there is shown, on the ordinate, the rotational deceleration $-a$, on the lower side, and the rotational acceleration $+a$, on the upper side of the abscissa or time axis $t$. The curve $l$ approximately represents the state of rotational movement of a brake-controlled wheel during a normal control cycle. The dot-dash line $G_1$ indicates the rotational deceleration actuation threshold. When the rotational deceleration of the wheel exceeds this threshold at time $t_{10}$, the sensor generates an electrical signal. However, this signal does not immediately initiate a reduction in brake pressure; rather, a delay interval T must first expire before, at $t_{11}$, the brake pressure begins to fall. The introduction of this delay interval forms the basis of the present invention.

As discussed above, in the "Background of the Invention," certain dead times are associated with the known brake control systems for preventing wheel locking. These dead times, which occur between the moment that the rotational deceleration-indicating electrical signal appears and the moment that the brake pressure has begun to fall, are due to the means with which the pressure reduction is effected. Although the dead times (e.g. the so-called "valve dead times" of the three point system) are normally undesirably dependent upon the pressure of the pressure medium, a preferred embodiment of the present invention is provided with a special device to determine the delay interval independently of the brake pressure. Moreover, as has been mentioned above, the present invention is mainly concerned with especially sensitive brake control systems. In such systems, the dead times of the valves are in the order of only about 5 milliseconds maximum, and are thus practically negligible.

Figure 3:
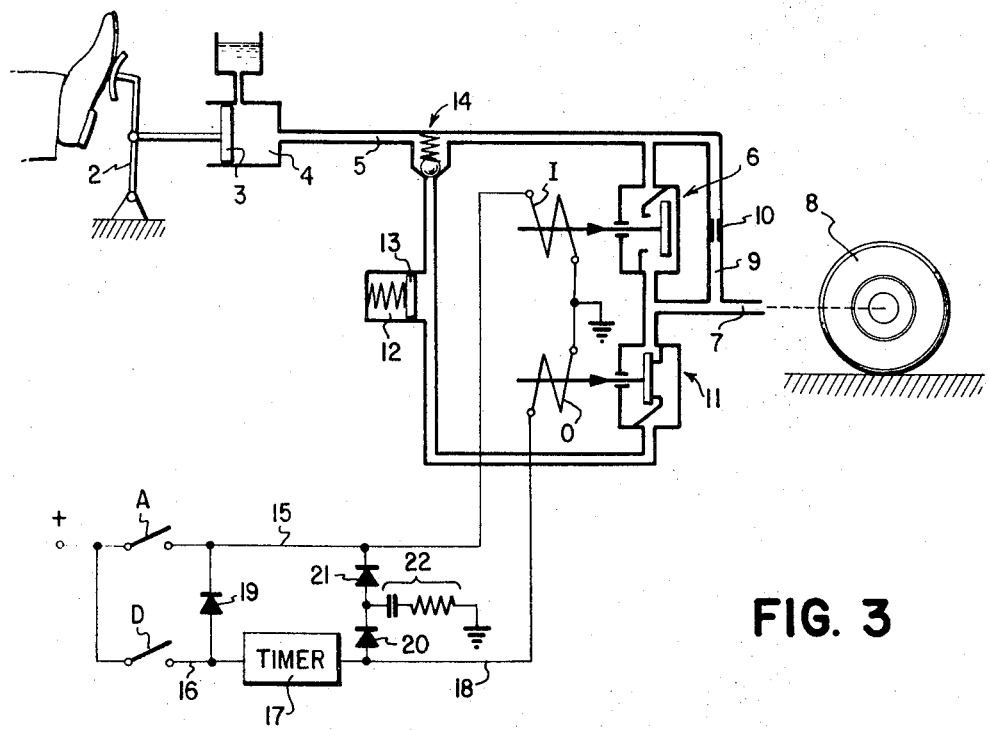
FIG. 3 is a combined electric and hydraulic schematic diagram of one preferred embodiment of the brake control system according to the present invention.

FIG. 3 schematically illustrates both the electric and hydraulic portions of an entire brake control system according to a preferred embodiment of the present invention. The hydraulic portion of the brake control system is of the type referred to above as the "three point system." Since this hydraulic system will also be utilized with the other embodiments of the present invention described below, the following discussion of this hydraulic system applies equally as well to these other embodiments.

Referring then to the hydraulic portion of the apparatus illustrated in FIG. 3, there is shown a driver-operated brake pedal 2 which actuates the piston 3 of a master brake pressure cylinder 4. The so-called "precontrol pressure"—i.e. the pressure directly regulated by the driver of the vehicle—propagates through a main pressure line 5 to an inlet valve 6 which is normally open. The inlet valve is in communication with the wheel brake cylinder of the vehicle wheel 8 via a line 7. The extension of this line 7 is shown in broken lines. The inlet valve is bridged by a further connecting line 9 which contains a narrow nozzle 10 that acts as a choke. The line 7 leading to the wheel brake cylinder is also connected to a storage chamber 12 via an outlet valve 11 which is normally closed. The storage chamber 12 consists of a cylinder and a piston 13 which is normally held, by the pressure of a very weak retaining spring, in the illustrated position. The storage chamber 12 is in communication with the main pressure line 5 via a ball check-valve 14. This check-valve permits a flow only from the storage chamber to the main pressure line. The inlet valve 6 and the outlet valve 11 are constructed to be magnetically actuated. The excitation windings are marked I and O, for "inlet" and "outlet," respectively.

The hydraulic system knows three operational states, or three possible valve position combinations. First, the system is normally in the illustrated state in which the inlet valve is open and the outlet valve closed. The brake pressure in line 7 is here determined by the precontrol pressure in line 5. During a control cycle, in which the valve positions alternate in rapid succession, this is the state called "pressure rising." When both values are closed, the state is known as the "pressure constant" state. This term is not quite accurate in view of the fact that the brake pressure actually increases slowly due to the choke 10, in line 9. This pressure increase is many orders of magnitude slower, however, than it is when the inlet valve is open. The term "pressure constant" is thus retained below for reasons of simplicity. Finally, the third state results when the inlet valve is closed and the outlet valve is open. Here the "pressure is decreasing" since the amount of pressure medium flowing in through the choke 10 will be much less than that flowing out through the open outlet valve. The discharged pressure medium fills storage chamber 12, since, due to the increased pressure in line 5, the check-valve will remain closed. Only when the driver lifts his foot from the brake pedal, can the storage chamber empty its contents into the main pressure line thus concluding the braking process and preparing the system for renewed brake action.

The magnetic valves together with the choke, the storage chamber and the check-valve form a so-called "pressure control unit," i.e. a structural group which is inserted between the master brake pressure cylinder (or, in systems with brake-power amplification, between the secondary cylinder) and the wheel brake cylinder. Together with the signal generator arrangement or "sensor" which will be discussed below, it comprises the complete system for preventing wheel locking. Instead of the described pressure control unit, it is possible to employ other brake pressure modifying embodiments, if required; e.g. systems with precontrolled valves (particularly for pneumatic brake systems) or systems which effect a reduction of the brake pressure with the aid of an auxiliary force or by means of a so-called "modulator."

In this example, the signal generator is a sensor (not shown) which has a spring-restrained mass, connected to rotate with the vehicle wheel, that actuates an acceleration contact A and a deceleration contact D to close the circuit to a voltage source marked "+." A line 15 leads from the acceleration contact A to the winding I of the inlet valve. A line 16 leads from the deceleration contact D to the input of an electronic timer 17. The timer is operative so that its output signal will appear a predetermined interval after application of the input signal, and disappear as soon as the input signal disappears. A line 18 connects the output of the timer with winding O of the outlet valve; the other ends of the two windings I and O are connected to ground. The lines 15 and 16 are connected together via a diode 19 which permits a current to flow from the deceleration contact to the winding of the inlet valve. Lines 15 and 18 are connected together via two series-connected diodes 20 and 21 so that the current can also flow from the output of the timer to the winding I. Finally, the point of connection of the two diodes 20 and 21 is connected to ground via a series RC element.

Figure 4:
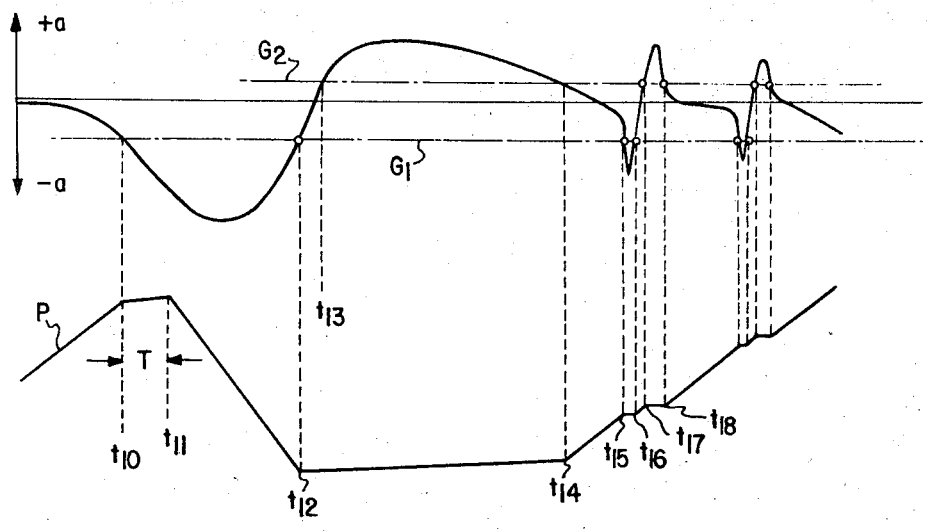
FIG. 4 is a graph showing an exemplary response of the apparatus of FIG. 3.

FIG. 4 illustrates the mode of operation of the arrangement of FIG. 3. As long as the driver of the vehicle does not apply the brake, the rotating driven member within the wheel sensor remains in synchronism with the rotating drive member; i.e., no relative rotation occurs. Consequently, the contact D, which is actuated by a rotational deceleration, as well as the contact A, actuated by a rotational acceleration, will be open. If, when the wheel 8 is being braked, its rotational deceleration exceeds the threshold value $G_1$, the contact D will close, in the example at time $t_{10}$. It is assumed that at this moment the brake pressure P in line 7 has not yet reached the preliminary control pressure available in line 5, but is still increasing, as shown in FIG. 4. From time $t_{10}$ a potential is applied to timer 17; simultaneously, the magnetic winding I of the inlet valve is excited via the diode 10 so that this valve closes. The pressure P will then increase only slowly due to the choke 10.

After expiration of the delay interval T, preset in the timer 17, a potential is also applied to line 18 to open the outlet valve 11. At the same time, a potential is applied to the RC element 22 and its capacitor is thus charged. The pressure reduction, which now begins, prevents further rotational deceleration of the wheel 8. The rotational deceleration passes through its maximum and, at time $t_{12}$, again falls below the actuation threshold $G_1$. The contact D then opens again removing the voltage on line 18 and allowing the outlet valve to close. The pressure is then held constant again, or rather, is increased only slowly by flow through the choke 10.

The inlet valve will still remain closed because the RC element 22 can discharge via the diode 21 and winding I. The discharge current flows at least until the rotational acceleration of the wheel has reached the rotational acceleration actuation threshold value $G_2$ at time $t_{13}$. The contact A then closes and supports the current to the inlet valve winding. The reduced brake pressure thus remains practically constant from time $t_{12}$ to time $t_{14}$, when the contact A opens again, completing the cycle, and the brake pressure is allowed to increase.

Normally, the brake fluid pressure will increase without interruption to approximately the same level that it had between times $t_{10}$ and $t_{11}$; from here it might possibly be reduced again in a new control cycle. However, in order to demonstrate the effect of the timer 17, the decelerations and accelerations are illustrated which occur during two brief torsional oscillations of the wheel. As already mentioned, these aberrations can also be due merely to signal oscillations; i.e., fluttering of the contacts D and A. At time $t_{15}$ contact D closes, closing the inlet valve 6. However, before the delay interval T has elapsed, D opens again at $t_{16}$. Since the RC element 22 had no potential, the inlet valve opens again and the pressure increases further. From $t_{17}$ to $t_{18}$ contact A closes because the rotational accelerational lies above the limit $G_2$. During this period the inlet valve also closes once more. After the acceleration drops to a value below $G_2$, then the pressure increases further and the same process is repeated. In spite of the short rotational deceleration peaks which extend beyond the threshold value $G_1$, the brake control system, according to the invention, does not initiate a pressure reduction. The fact that the brake pressure is momentarily kept constant between $t_{15}$ and $t_{17}$, between $t_{17}$ and $t_{18}$, etc., and rebuilding of the brake pressure is thus interrupted is not a drawback; rather, it has a favorable effect on the operation of the system.

Figure 5:
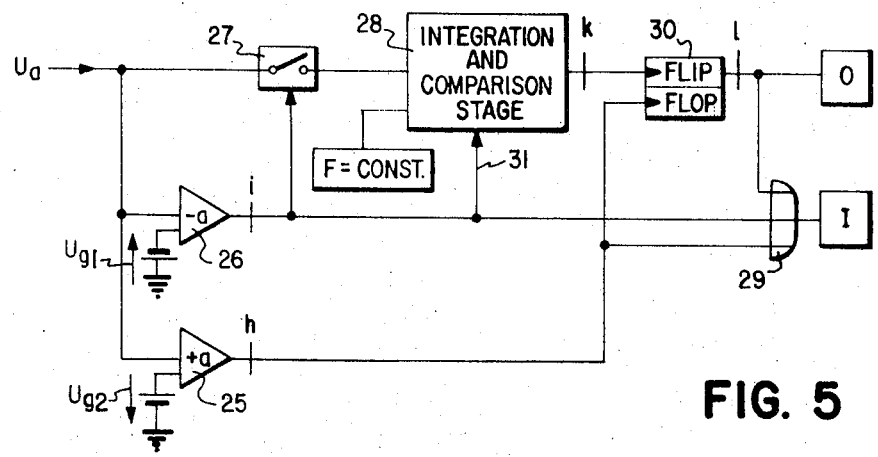
FIG. 5 is a block diagram of an electronic embodiment of the brake control system according to the present invention which employs an integration and comparison stage.

The electronic embodiment of the present invention illustrated in FIG. 5 is limited to a block diagram of the electric portion of the brake control system. I and O are the windings of the inlet and outlet valves respectively. Two sum-and-difference amplifiers 25 and 26, to which are applied a potential $U_a$ proportional to the rotational acceleration and deceleration of the wheel, take the place of the mechanically actuated contacts of the preceding example. Apparatus suitable for producing this voltage is not illustrated and described in detail since such apparatus is well known in the art. It is possible, for example, to produce the voltage $U_a$ by integration of the speed-proportional voltage of a tacho-generator that is coupled to rotate with the wheel.

As illustrated in FIG. 5, a potential $U_{g1}$ is applied to a second input of the sum-and-difference amplifier 26. This potential defines the actuating threshold for the rotational deceleration signal. At point $i$ at the output of this amplifier, a voltage is present only when, with identical polarity, $U_a > U_{g1}$. The notation $-a$ of this amplifier is intended to indicate that it is, so to speak, a rotational deceleration sensor. Similarly, a permanently-set voltage $U_{g2}$ of a polarity opposite to that of $U_{g1}$ is applied to the second input of the amplifier 25. At point $h$ at the output of this amplifier, which is marked $+a$, a potential is present when $U_a$ exceeds the threshold value $U_{g2}$. This behavior, as well as the behavior of the amplifier 26, is shown in the pulse diagram of FIG. 6.

In addition to the two sum-and-difference amplifiers, the voltage $U_a$ is applied to an integration and comparison stage 28 via a gate circuit 27. The gate circuit is normally open; however, it permits signals to pass as long as a potential is present at the output of amplifier 26. A permanently set comparison value F flows into the integration and comparison stage through a parallel input. At the output of the stage there then appears a signal $k$ whenever, after the gate 27 begins to pass a signal the time integral of voltage $U_a$ exceeds the comparison value F. A further input 31 to the integration and comparison stage 28 is connected to the output of the amplifier 26 and serves to reset the integration stage (e.g., set it to zero) as soon as the signal $i$ disappears.

The output of amplifier 26 is also connected to the winding I of the inlet valve via an OR-gate 29. The output of the amplifier 25 is connected to one input of a flip-flop 30 and also to the OR-gate 29. The output of the integration and comparison stage 28 is connected to the other input of the flip-flop 30. The output of the flip-flop carrying the signal $l$, leads to the third input of the OR-gate 29 and in parallel therewith to the winding O of the outlet valve. A pulse from amplifier 25 switches the flip-flop to the state in which its output has no potential. A pulse at its other input switches it back.

Figure 6:
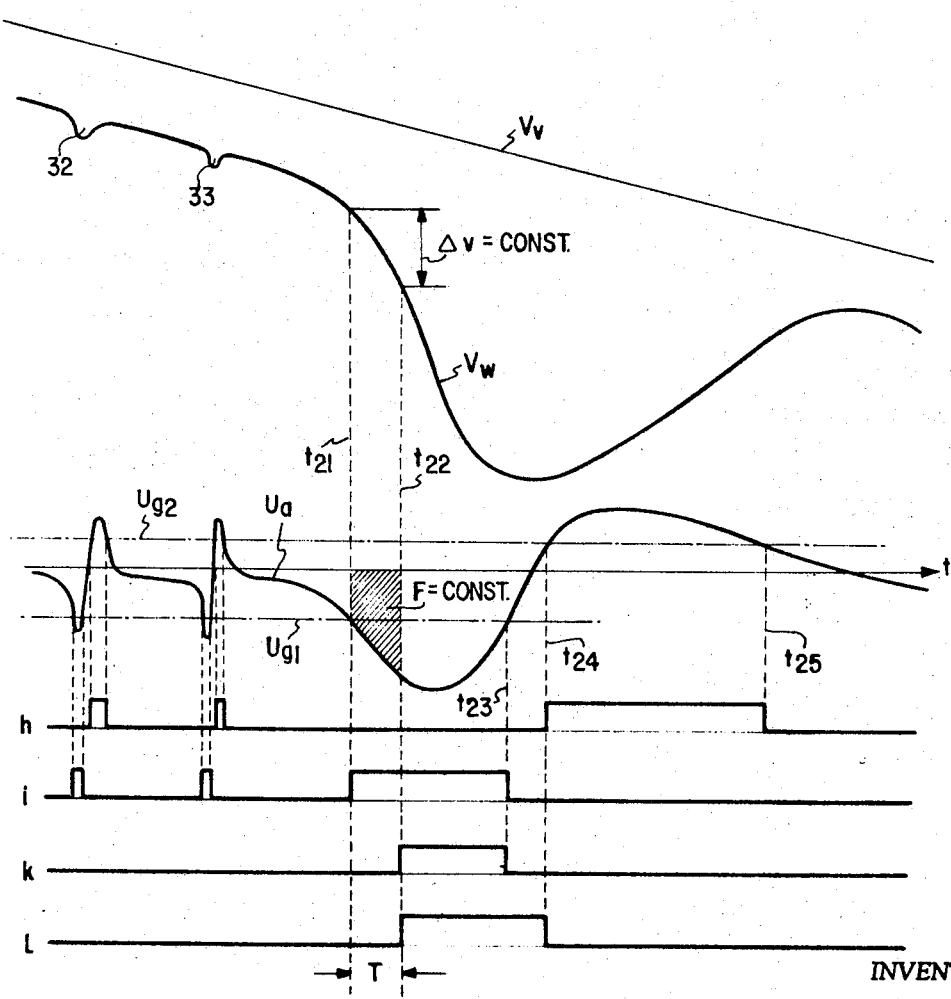
FIG. 6 is a graph showing an exemplary time response of the apparatus of FIG. 5.

FIG. 6 is a graph showing the time dependence of the vehicle speed $V_v$, the speed at the circumference of the wheel $V_w$, the voltage $U_a$ proportional to the rotational deceleration or acceleration, respectively, of the wheel and the pulses at points $h$, $i$, $k$ and $l$ of the block circuit diagram illustrated in FIG. 5. The graph exhibits these values during the braking action of the vehicle so that the speed of the vehicle $V_v$ decreases fairly uniformly with respect to time. The speed at the circumference of the wheel is less than the speed of the vehicle since the wheel is being braked. It exhibits first two smaller, more or less accidental dips 32 and 33. These fluctuations in the wheel speed and the associated rotational decelerations and accelerations should not introduce a reduction in the braking pressure. Thereafter a greater reduction in wheel speed occurs which causes the wheel to begin to lock; this wheel action is thus regulated by the brake control system of FIG. 5.

The first two negative peaks of the voltage $U_a$ initiate two short pulses $i$ to the extent that they exceed the threshold value $U_{g1}$. These pulses open gate 27 and switch the integration and comparison stage 28 in and out. In no case, however, will the preset comparison value F=constant be reached. The corresponding pulses $h$, i.e., the rotational acceleration signals, will momentarily close the inlet valve. However, they will leave no influence on the outlet valve since flip-flop 30 is already in the state position in which the outlet valve is without a potential.

At time $t_{21}$ the integration stage again begins to operate; it integrates the voltage $U_a$ which increases negatively, until, at time $t_{22}$, $U_a dt = F$ and signal $k$ appears. The comparison value F is shown in FIG. 6 as a hatched area below curve $U_a$. This area corresponds to a very definite speed differential $\Delta v$ at the circumference of the wheel which is also shown in FIG. 6. The signal $k$ flips flip-flop 30 so that the signal $l$ will appear at its output and open the outlet valve. This signal also acts to hold the inlet valve closed.

Due to the reduction in pressure, the deceleration of the wheel again decreases and $U_a$ falls below the threshold value $U_{g1}$ at time $t_{23}$, terminating the pulse $i$. The trailing edge of the pulse $i$ resets the integration stage and opens the gate 27. The signal $k$ will thus be terminated simultaneously; however, the flip-flop 30 will remain in its output-producing state. Consequently, the inlet valve will not be opened because of the continuing signal $l$. At time $t_{24}$ the rotational acceleration signal $h$ arrives which acts simultaneously to switch back flip-flop 30 and maintain closed the inlet valve through the OR-gate 29. Only after the termination of the signal $h$, at time $t_{25}$, is the brake control system restored to its original state and the brake pressure again allowed to rise.

The essential difference between this embodiment and the preceding one is that the delay interval T, i.e., the interval between $t_{21}$ and $t_{22}$, is not defined by a fixed value. Rather, T is the time which expires between occurrence of the rotational deceleration signal $i$ and the moment at which the speed at the circumference of the wheel has fallen past the differential value $\Delta v$ predetermined by F. If $\Delta v$ does not fall by this differential value, no pressure reduction will occur.

Figures 7, 8:
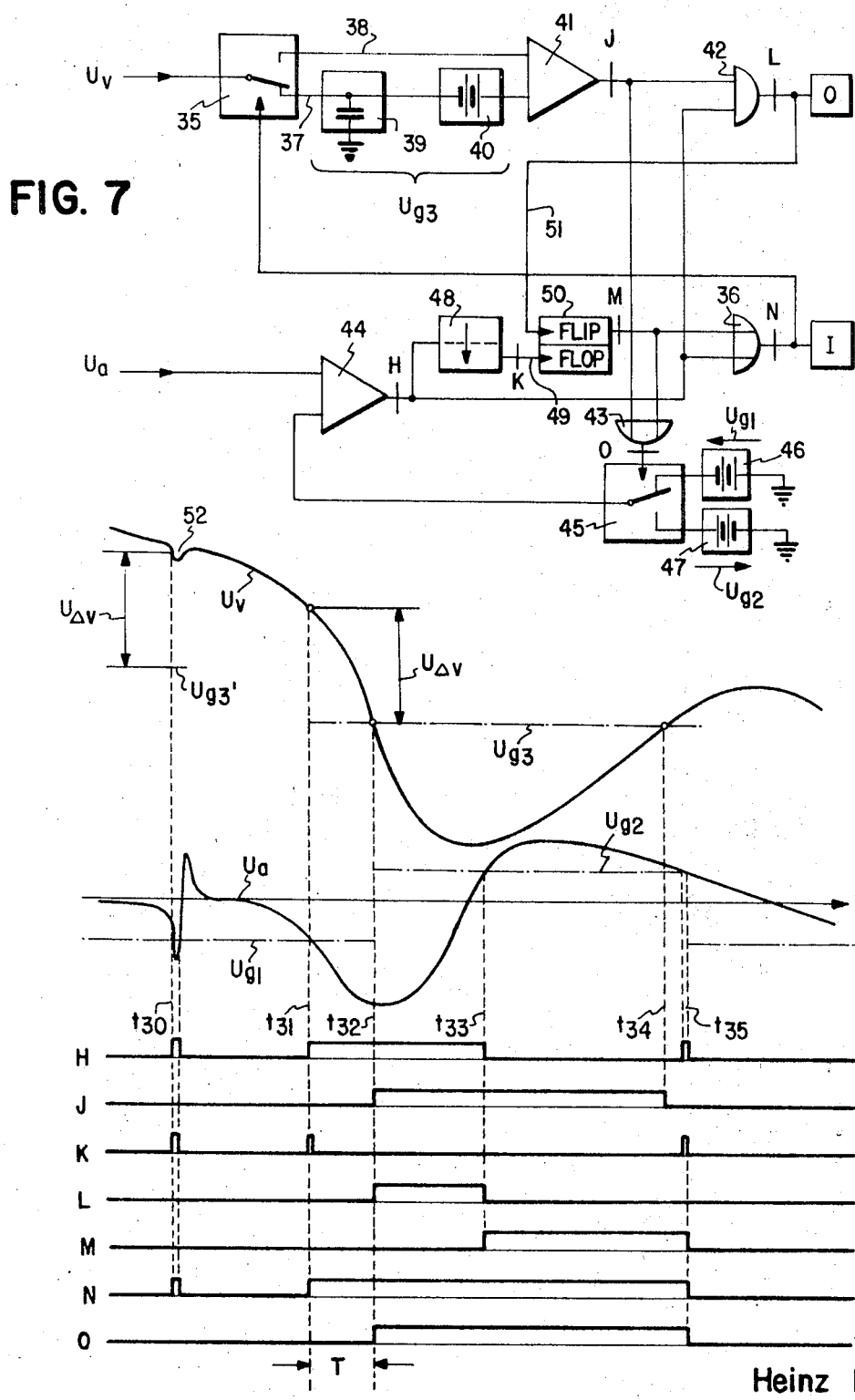
FIG. 7 is a block diagram of another electronic embodiment of the brake control system according to the invention. This embodiment operates with a speed comparison.
FIG. 8 is a graph showing an exemplary time response of the apparatus of FIG. 7.

FIG. 7 shows a further embodiment of the present invention comprising means similar to that of FIG. 5 in which electrical signals are also generated for the outlet and inlet valve windings O and I. Here, too, sum-and-difference amplifiers are used; the initial values for the signal generation are here supplied by a wheel-speed-proportional voltage $U_v$. This voltage may be produced by any well-known speed proportional signal generator.

The voltage $U_v$ is fed to a switch 35 which can be actuated by a signal N. This signal emanates from the output of an OR-gate 36 and is simultaneously the control signal for the inlet valve winding I. In the illustrated, no-voltage state the switch 35 connects its input with an output 37. This ouput first leads to a memory element 39, which is able to store the voltage $U_v$ during the switch-over period of switch 35, and then, through voltage source 40, to a sum-and-difference amplifier 41. The source 40 supplies a voltage $U_{\Delta v}$ of opposite polarity from voltage $U_v$: that is, $U_{\Delta v}$ is proportional to the predetermined speed difference $\Delta v$ at the circumference of the wheel. The other output 38 of switch 35 is connected to the second input of the sum-and-difference amplifier 41. A signal J appears at the output of the amplifier 41 when the voltage on the line 38 falls below the difference between the voltages of the memory 39 and the constant voltage source 40. This differential voltage is called $U_{g3}$ and represents the limit or threshold value of the sum-and-difference amplifier 41. The output of the amplifier is connected to an AND-gate 42 as well as to an OR-gate 43.

The voltage $U_a$ is fed to a sum-and-difference amplifier 44. At the input of this amplifier there are two different threshold value voltages which can be selected by means of a switch 45. The switch is operated by a pulse O which comes from the output of OR-gate 43. Since here, too, the no-voltage state is illustrated the voltage source 46 is connected to the lower input of the sum-and-difference amplifier 44. This voltage source furnishes the threshold value $U_{g1}$. If the pulse O is present, the switch 45 switches to connect the second voltage source 47, which furnishes the oppositely poled threshold value $U_{g2}$, to the amplifier 44. The sum-and-difference amplifier 44, in contrast to amplifier 41, responds only to the sign of the difference $U_a - U_{g1}$ or $U_a - U_{g2}$, respectively. The amplifier 41 will produce an output whenever this difference is negative.

The output of amplifier 44, which carries the signal H, is divided into three branches. One branch leads to a monostable multivibrator 48, the second to the OR-gate 36 and thus to the inlet valve winding I, and the third to the AND-gate 42 and thus to the outlet valve winding O. The output of the monostable multivibrator 48, which has pulses marked K, is connected to an input 49 of a flip-flop 50. The other input 51 of this flip-flop receives pulse L from the output of the AND-gate 42. The trailing edge of this pulse throws the flip-flop 50 into the state for which a potential is present at its output. Pulses at this output are marked M and flow to the OR-gates 36 and 43.

FIG. 8 is the corresponding curve and pulse diagram for the embodiment illustrated in FIG. 7. The top part of FIG. 8 shows the voltage curves $U_v$ and $U_a$ while the bottom shows the time response of the pulses at the points of FIG. 7 which are marked by transverse lines and capital letters. FIG. 8 further shows the threshold values $U_{g1}$ and $U_{g2}$ of amplifier 44 as well as the dependent threshold value $U_{g3}$ of amplifier 41.

The operation of the embodiment of FIG. 7 will now be described in connection with the graph of FIG. 8. As in the preceding example, the vehicle wheel to be braked first experiences a momentary deceleration which is insignificant for the braking action. This is shown in the voltage curve $U_v$ as a small dip 52. In response thereto, the voltage $U_a$ swings out toward both sides. The downward pointing peak of $U_a$ exceeds the threshold value $U_{g1}$ at time $t_{30}$ and thus effects a momentary signal H at the output of amplifier 44. This signal produces a parallel signal N which momentarily closes the inlet valve and changes the position of switch 35. The signal H also trips the monostable multivibrator 48; however, the even shorter pulse $k$, which is produced, remains ineffective since the flip-flop 50 is already in the state in which its output has no potential.

Particularly significant is the fact that no signal appears at the output of the amplifier 41. This fact is due to the failure of the signal $U_v$ to fall below the threshold value $U_{g3}$ during the time that the switch 35 is in the upper position. At the moment that the signal N switches the switch 35—that is, at time $t_{30}$—the instantaneous voltage $U_v(t_{30})$ is stored in the memory element 39. From this stored voltage is subtracted the threshold voltage $U_{\Delta v}$ of the voltage source 40 and the difference applied, as the threshold voltage $U_{g3}$, to the amplifier 41. Since, during the period of the pulses H and N beginning at time $t_{30}$, $U_v$ drops to a value nowhere near this threshold value, this arrangement effectively prevents a reduction in pressure at the occurrence of a momentary rotational deceleration of the wheel.

This momentary deceleration is followed, in FIG. 8, by a typical control cycle. The voltage $U_a$ exceeds the threshold value $U_{g1}$ at time $t_{31}$ and continues to become negative. Signals H, K and N appear with the same effects as before. The somewhat lower threshold value $U_{g3}$ will now be applied to the amplifier 41. The voltage $U_v$, which is then present on line 38, soon falls below the threshold value $U_{g3}$ and, at time $t_{32}$, causes the signal J to appear at the output of amplifier 41.

The presence of the signal J has two effects. First, the signal L will be produced since signal H is already present at the other input of AND-gate 42. The signal L opens the outlet valve, initiating the reduction in pressure. Secondly, the signal J produces the signal O at the output of the OR-gate 43. The switch 45 is thus thrown downward and the sum-and-difference amplifier 44 connected to the threshold value $U_{g2}$. The change in threshold values effects the continuance of the signal H.

At time $t_{33}$, $U_a$ reaches the new threshold value $U_{g2}$ and signal H disappears. This terminates the signal L so that the outlet valve will close again. At the same time, the trailing edge of the latter pulse flips the flip-flop 50, via line 51. The pulse M thus appears and maintains, via OR-gate 36, signal N, in the absence of H. At time $t_{33}$ the rotational deceleration has already changed again to a rotational acceleration. $U_{g2}$ is thus, so to speak, a rotational acceleration threshold value as in the preceding example.

At time $t_{34}$, voltage $U_v$ exceeds the threshold value $U_{g3}$ in the opposite direction so that the signal J drops to zero. No change in the positions of the inlet and outlet valves will occur, however, until, at time $t_{35}$, voltage $U_a$ exceeds the valid threshold value $U_{g2}$, causing the signal H to be emitted again. This signal trips the monostable multivibrator 48 and the trailing edge of the associated short pulse K returns the flip-flop to its original state.

Thus, signals M, N and O come to an end; the inlet valve is allowed to open and switches 35 and 45 fall back into the positions shown. Moreover, due to the change in threshold value in the amplifier 44, pulse H also immediately ceases. The circuit is now ready again for a new control cycle.

In its end result, therefore, this arrangement of FIG. 7 operates in the same manner as the embodiment according to FIG. 5. In both cases the delay interval T depends on how fast the wheel traverses the speed differential $\Delta v$. A difference appears only in that the moment of the pressure reduction is here derived from the speed-proportional voltage $U_v$ while in the circuit of FIG. 5 it is derived from the acceleration—or deceleration—proportional voltage $U_a$. A momentary value of $U_v$ here serves as a comparison from which a fixed voltage $U_{\Delta v}$ is subtracted, while in the previous embodiment the integral of $U_a$ is compared with a fixed value F. Since the voltage $U_a$ must always be derived from a differentiation of $U_v$, FIG. 7 may provide the simpler solution for an electronic system according to the present invention.

Whereas in the previous examples the rotational speed, or respectively, the rotational deceleration and acceleration of the wheel were reproduced as electrical values and the actual signals were derived from these electrical signals, the following example uses a so-called mechanical sensor. This sensor contains a spring-retained rotatable driven member which can effect relative motion with respect to a rotatable drive member and thus actuate a plurality of contacts. This sensor is therefore normally a rotational accelerometer. The present invention provides that the relative motion of the driven member caused by a rotational deceleration be attenuated in one rotational direction to such an extent, by means of an escapement retard mechanism, that the rotational accelerometer be converted, at least approximately, to a tachometer during one special operational phase. This retard mechanism thus takes over the function of the integration and comparison stage of the embodiment according to FIG. 5.

The details of the mechanical sensor will first be described with the aid of FIG. 9. The illustration is essentially schematic, particularly in relation to the manner in which the rotatable driven member is mounted.

Figure 9:
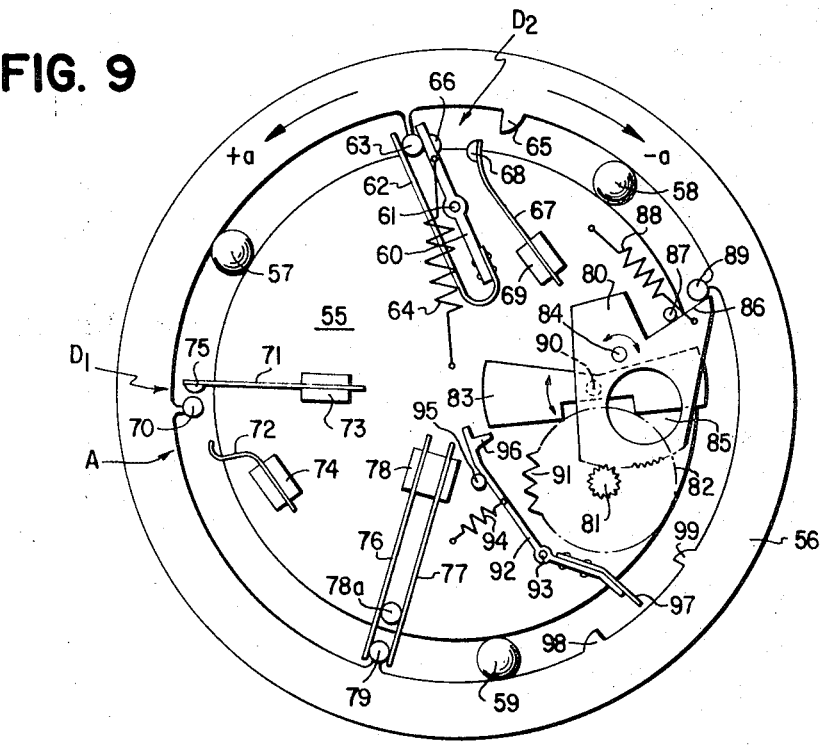
FIGS. 9–13 are representational diagrams of a mechanical-electrical sensor in various operating positions. This sensor functions with an escapement mechanism to achieve the delay characteristic according to the present invention.

The central disc-shaped portion 55 in FIG. 9 is the so-called drive member. This member is mounted to be rotated around a central axis which is perpendicular to the plane of the paper and connected to be driven by the wheel to be braked. It is preferable if the drive member is connected to rotate faster than the wheel. The drive member is surrounded by an annular member 56 which may rotate relative to the drive member 55. This relative rotational mobility is indicated in the figure by three ball bearings 57 to 59.

A rocker arm 60 is pivoted on the drive member by a pin 61. A U-shaped leaf spring 62 is riveted at the lower end of the rocker arm. Between this leaf spring and the upper portion of the rocker arm extends a ball-shaped follower 63 which is fastened to the driven member by a radially extending stem. A tension spring 64, having one end attached to the upper half of the rocker arm and the other fastened to the drive member, pivots the rocker arm toward the left in this illustration.

If the driven member moves toward the right relative to the drive member, it is able to pivot the rocker arm toward the right due to the action of follower 63 and the tension spring 64. A contact bead 66 on the upper end of the rocker arm then touches a contact bead 68 which is borne by a contact spring 67. The contact spring is fastened to the drive member by means of a block 69 of insulating material. The rocker arm and the contact spring 67 together form a switching contact which is actuated when the rotational deceleration of the wheel exceeds a certain threshold and which, for reasons of simplicity, is called the "deceleration contact" $D_2$ in the following description.

Figure 11:
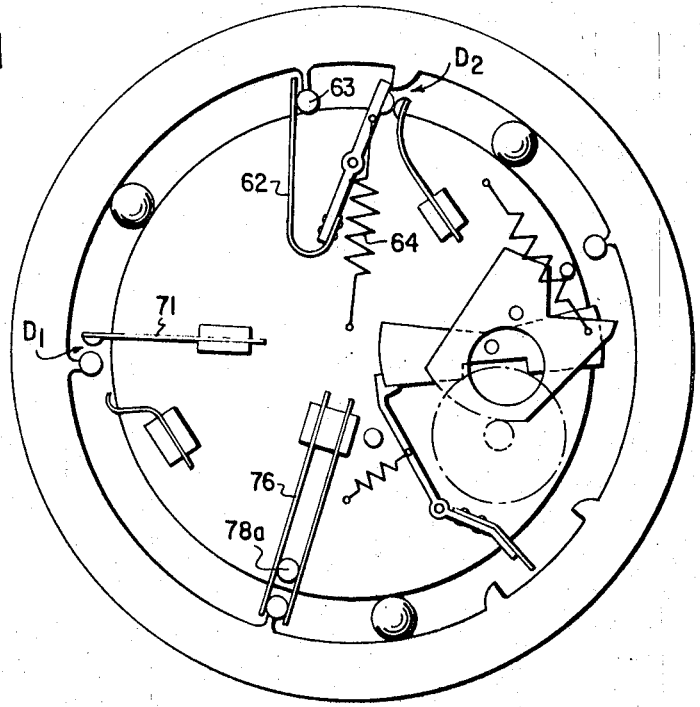
Figure 12:
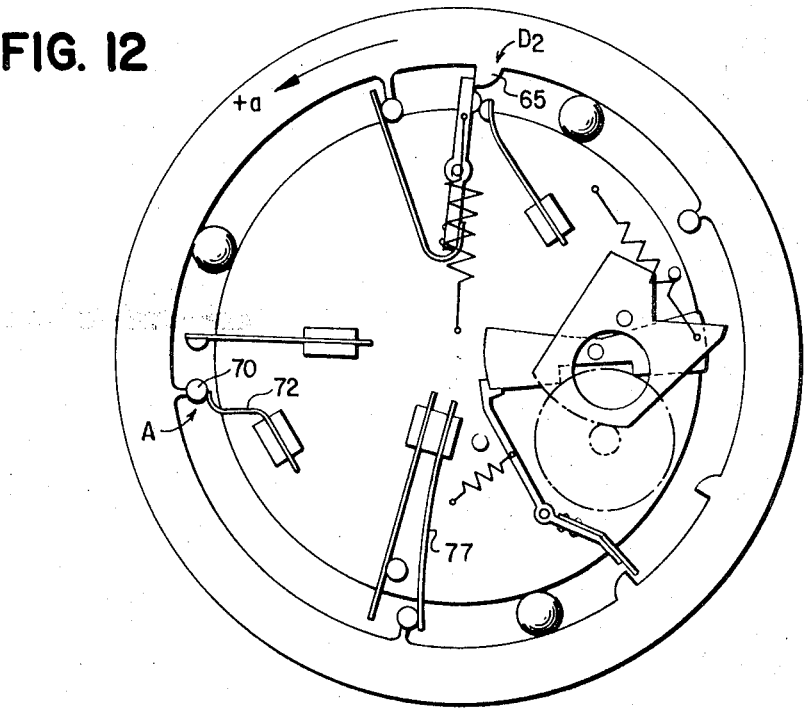

A follower 65 on the driven number is the only means for opening this deceleration contact, i.e., for resetting the rocker arm toward the left, as can be seen more particularly in FIGS. 11 and 12. The follower 63 biases the leaf spring 62 when the rocker arm is in its right-hand state. However, this leaf spring is too weak to bring the rocker arm back over its dead center position against the action of the tension spring 64. It serves only to prevent the rocker arm from accidentally stopping at dead center. If the rocker arm were permitted to remain in this unstable center position, it would be possible for it to flip over to the right at the inappropriate time, due to shock or vibration. Above all, this could happen without an actuation of the brakes thus rendering it impossible to develop brake pressure; i.e., rendering the brake system ineffective.

A round contact bead 70 is also disposed on the rotational mass. This bead cooperates with two contact springs 71 and 72, which are fastened in an insulated manner to the drive member at 73 and 74. The contact spring 71 bears a contact bead 75 which comes in contact with one side of the contact bead 70. This switching contact will be called the preliminary deceleration contact $D_1$ in the following discussion; like the contact $D_2$, it also closes a current path when a rotational deceleration occurs, however, at a smaller deceleration and chronologically before the contact $D_2$, since its switching path is shorter. In the opposite rotational direction of the driven member, i.e., in the direction of the arrow marked $+a$ (rotational acceleration), the contact bead 70 brushes past the hook-shaped contact spring 72. This so-called "acceleration contact" A is thus first closed and then opened again when a correspondingly large rotational angle has been reached.

The schematic illustration of FIG. 9 does not show how the individual contact elements are supplied with current. This may be accomplished in any manner known in the art, or as described as follows. The contact elements which are movable with respect to the drive member, i.e., the rocker arm 60 and the contact bead 70, are connected, via flexible wires, to intermediate terminals or clamps disposed on the drive member. From these intermediate terminals and from the individual contact springs 67, 71 and 72, conductive paths lead, via slip rings and brushes, to stationary electrical terminals attached to the sensor chassis. A general circuit which explains the function of the electrical connections will be discussed below in connection with FIG. 14.

To fix the central or "rest" position of the driven member (with respect to the drive member) two leaf springs 76 and 77 are provided. These springs are pretensioned against each other and fastened to the drive member at 78. Between them, they tightly enclose an abutment pin 78a, fastened to the drive member, and a round follower 79, fastened to the driven member. If the driven member moves out of its central position in one direction or the other, one of the two leaf springs will be bent outward and will tend to force the driven member back.

The escapement retard mechanism, according to the present invention, consists of a toothed member 80, a pinion 81 which forms a unit with the large-toothed drive gear 82, and a pallet 83. The toothed member 80 is pivoted about a pin 84 and provided with a circular opening 85 to improve the distribution of its mass. The teeth which engage with the teeth of the pinion 81 are indicated in FIG. 9. Under the action of a return spring 88, an edge 86 which extends radially outward from the pin 84 rests against an abutment pin 87. A follower 89 of the driven member rests against the outer end of this edge when the driven member is in its rest position.

The pallet 83 pivots about a stationary pin 90, which in FIG. 9 is covered by the toothed member 80. The edges of a rectangular recess in the pallet cooperate with the teeth 91 of the drive gear in such a manner that when the drive gear rotates, the pallet rocks back and forth. The teeth 91 are indicated on a portion of the drive gear 82. When the driven member 56 then rotates to the right with respect to the drive member 55, the toothed member 80 is carried along by the follower 89 and the pallet is set into a rapid rocking motion. This causes the spring 88 to be tensioned.

Finally, a blocking lever 92 is also provided which pivots around a pin 93. It is held in position against an abutment pin 95 by a retaining spring 94. At the upper portion of the blocking lever is disposed a latch 96 which interrupts the movement of the pallet 83 when the lever is pivoted toward the right. The lower end of the blocking lever is extended by a riveted leaf spring 97 which protrudes between two additional followers 98 and 99 on the driven member. Under the action of these followers it is achieved that in the final deceleration position of the driven member the blocking lever swings into the range of movement of the pallet and stops it whereas at the beginning of a rotational acceleration the blocking lever releases the retard mechanism allowing the toothed member 80 to return.

Figure 10:
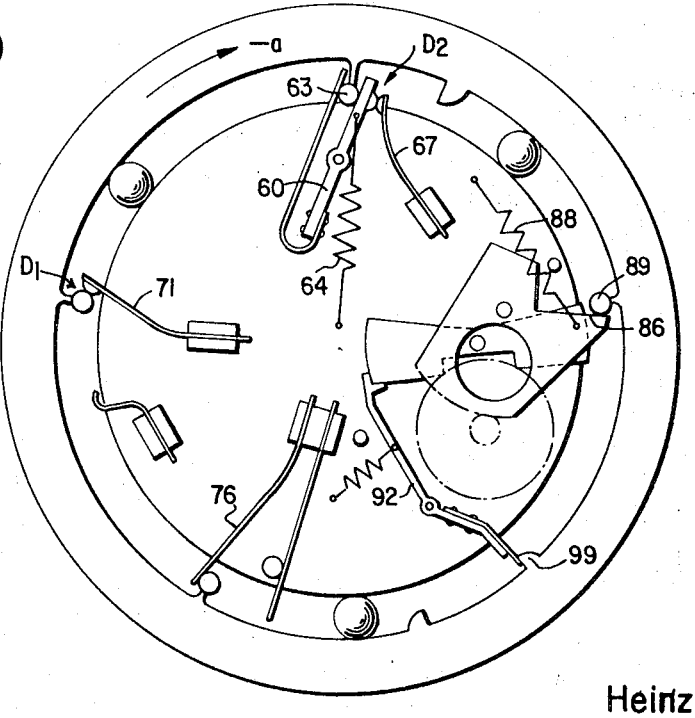

The various switching actions which are possible with the sensor just described will now be considered, with the aid of FIGS. 9 to 13, in the sequence in which they occur during a normal control cycle. Starting from the central position of the driven member and an opened deceleration contact $D_2$ as shown in FIG. 9, it is first assumed that the vehicle wheel is particularly strongly decelerated due to an exaggerated braking action. The arrow in FIG. 10 indicates that, due to the rotational deceleration, the driven member is rotated to the right with respect to the drive member. The retard mechanism is therefore driven by follower 89 in the direction which tensions the restraining spring 88. The blocking lever 92 remains, at first, out of the path of the pallet 83. Already, after a short movement, the driven member closes the preliminary contact $D_1$. In the course of further movement, the follower 63 presses the rocker arm 60 past its dead center position; i.e. the position at which the effective line of force of the spring 64 intersects the pivotal axis of the rocker arm. Then the rocker arm falls toward the right and closes the deceleration contact $D_2$. In the meantime, the follower 99 has approached the blocking lever 92 or, in particular, its extension 97, so that it finally twists it toward the right into the path of movement of the pallet. In order to reach this final position which is shown in FIG. 10, a considerable degree of rotational deceleration is required because the inertia of the driven member must overcome the forces of a total of four springs, i.e. springs 67, 71, 76, and 88. After the retard mechanism is blocked, the edge 86 of the toothed member 80 forms a firm final abutment for the follower 89.

When the rotational deceleration of the wheel is decreased, the driven member 56 first moves backward under the force of springs 71 and 76. The rocker arm, however, remains in its right-hand state even though the follower 63 bends the U-spring 62 toward the left. In the situation illustrated in FIG. 11 the driven member has again reached its central position. The preliminary contact $D_1$ is open. The leaf spring 76 is strong enough to counteract the force of the U-spring 62.

Referring now to FIG. 12, it is assumed that the vehicle wheel is subjected to an increasing rotational acceleration so that the driven member rotates toward the left deflecting the leaf spring 77. The follower 65 of the driven member then pivots the rocker arm toward the left. It should be noted here that before the rocker arm is flipped and while the contact $D_2$ is still closed, the contact bead 70 comes in contact with the bent contact spring 72. The acceleration contact A thus closes before the deceleration contact $D_2$ opens. As shown in FIG. 12, the rocker arm is near its dead center and the two above-mentioned contacts are closed.

Figure 13:
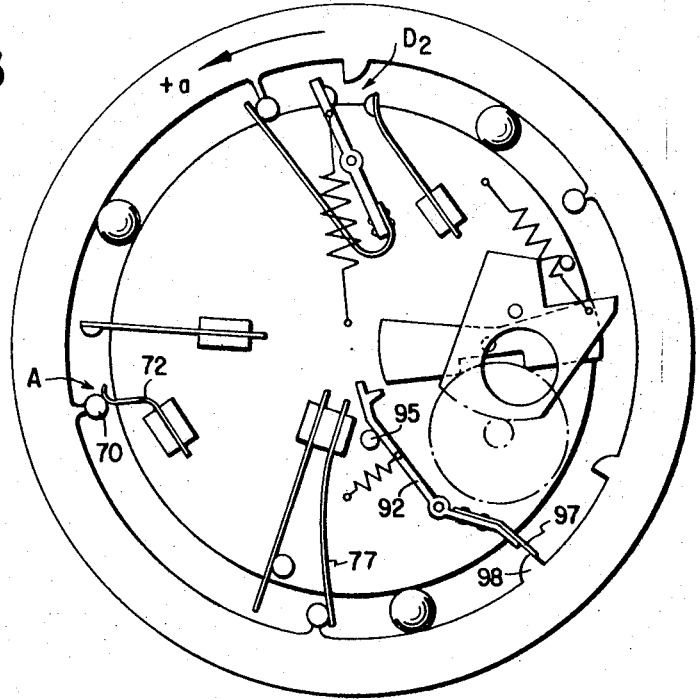

In the siutation shown in FIG. 13 the driven member has moved further to the left under the influence of still greater rotational acceleration. The rocker arm has now flipped over, opening the contact $D_2$. The contact bead 70 has moved further along the contact spring 72, but the deceleration contact A still remains closed. The follower 98 has just moved the blocking lever 92 back to its rest position and the retard mechanism has begun to return to its original position. If, now the acceleration further increases, the leaf spring 77 will be bent further. Since the extension spring 97 which is riveted to the blocking lever is also flexible, the follower 98 can continue to move even though the blocking lever is in contact with its abutment pin 95. In this case of a particularly high rotational acceleration, the contact bead 70 moves past the contact spring 72 and thus opens contact A. When the rotational acceleration of the wheel finally drops again, the leaf spring 77 will force the driven member back to its initial or normal position shown in FIG. 9; as it does so, the acceleration contact will temporarily close once more, then open again.

Figure 14:
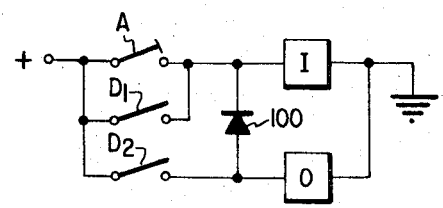
FIG. 14 is a schematic diagram of a circuit suitable for use in a brake control system with the sensor of FIGS. 9–13.

In the associated electrical circuit arrangement illustrated in FIG. 14, the three above-mentioned contacts are designated by the conventional circuit symbols. A is the wiper contact formed by elements 70 and 72 of the sensor of FIGS. 9–13; it closes and opens again during movement in the same direction. $D_1$ and $D_2$ are formed by elements 70 and 75, and 66 and 68, respectively. A and $D_1$ are connected in parallel and control the inlet valve, whereas $D_2$ controls both the outlet and the inlet valves. This dual function is accomplished with the aid of a diode 100 which interconnects the inputs of the inlet and the outlet valves and which is poled in such a manner that current can flow from $D_2$ to the inlet valve, but not from A or $D_1$ to the outlet valve.

Figure 15A:
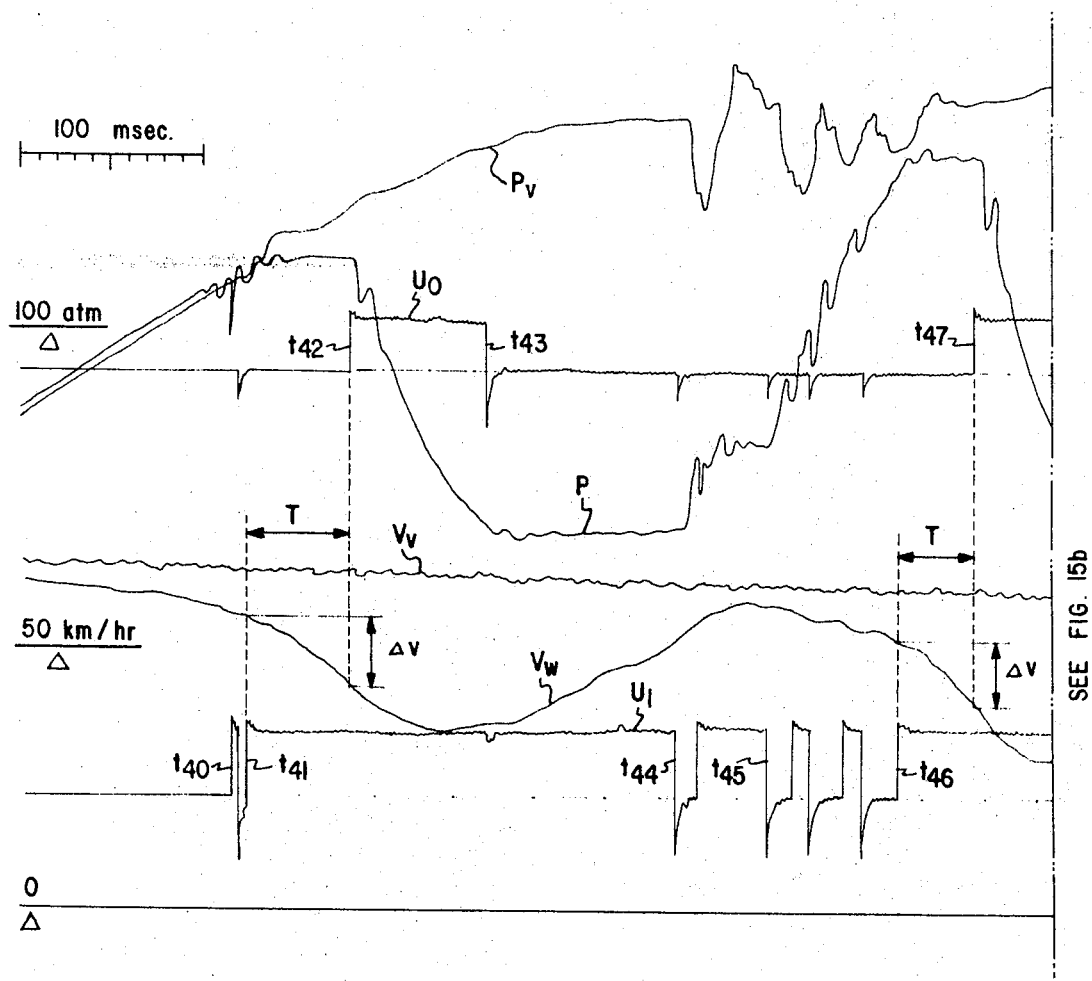
FIGS. 15a and 15b are a reproduction of a multiple-line oscillogram giving the time response of, and obtained during a test drive with a brake control system employing the sensor of FIGS. 9–13.
Figure 15B:
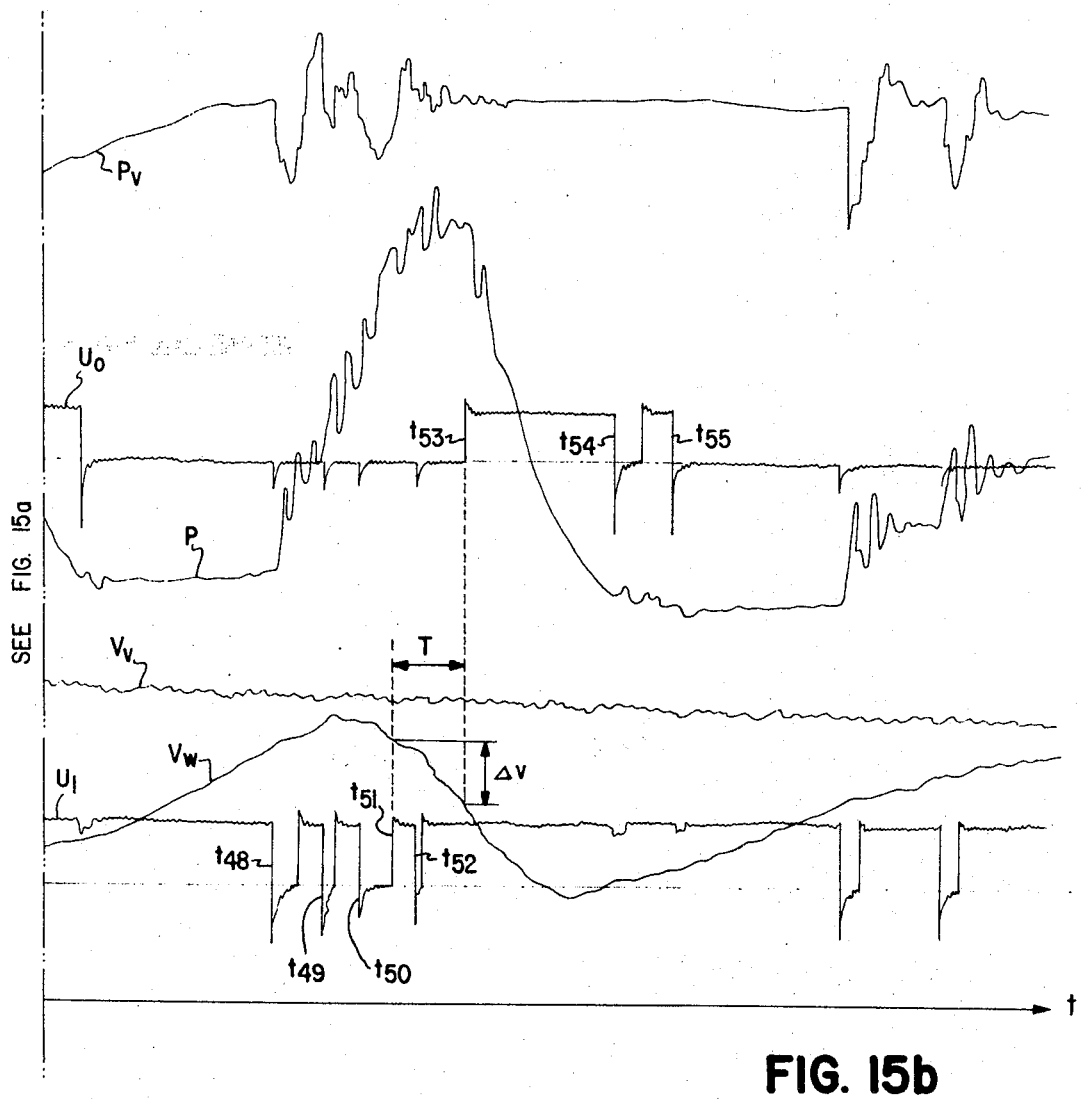

To further explain the operation of the system, according to the present invention for preventing wheel locking with the described mechanical sensor, reference is now made to FIG. 15. In order to provide a direct and realistic impression of the various functions of the system during controlled braking, an excerpt of a multiple-trace oscillogram is reproduced there, line by line. The oscillogram was obtained during a test drive which was made while braking on a dry plane roadway surfaced with a uniform pavement. The vehicle was provided with hydraulic disc brakes and only the right rear wheel was braked. The speed of the oscillograph paper was 32 cm./sec. The time scale is also entered in the figure. At the bottom of the figure is the zero line to which the pressure and speed measurements relate. The scale both for pressure and speed is designated by two markings: 50 km./hour and 100 atmospheres (gauge pressure), respectively.

The upper curve $P_v$ represents the precontrol pressure; i.e., the pressure produced by the driver in the master brake cylinder. P is the controlled brake pressure applied to the wheel brake cylinder measured shortly behind the pressure control unit. $V_v$ is the speed of the vehicle. At the beginning of the braking action the vehicle speed was approximately 60 km./hr.; during the braking process it fell rather uniformly, as indicated. This vehicle speed was measured by means of a tacho-generator coupled to a non-braked wheel. The roughness of the $V_v$ curve was produced by harmonics of the tacho-generator caused by wear. The speed $V_w$ at the circumference of the braked wheel was measured with a more accurate tacho-generator.

Finally, the oscillogram also shows the actuating voltages $U_O$ and $U_I$ of the outlet and inlet valve, respectively. These voltages were measured directly at the magnetic coils of the valves and represent the instantaneous valve positions. Since the zero lines associates with the voltage curves are also shown by a dot-dashed line, the states "voltage" and "no voltage" can easily be distinguished. As in the case of the valves illustrated in FIG. 3, the outlet valve will open and the inlet valve close when their respective voltages are present. The oscillogram should be read from left to right, with increasing time, as any conventional time diagram.

In the interest of thoroughness, it should be mentioned that at the moment of disconnection of one magnetic valve, induction pulses can be noticed in the measured voltage of the other valve. Thus, for example, at the times when the voltage $U_I$ drops to zero, the voltage curve $U_O$ exhibits a small downward-pointing peak.

At the beginning of the recording the braking process had already been initiated. Both valves were still without potential, however, and the speed of the vehicle $V_v$ was still almost 60 km./hr. The speed at $V_w$ at the circumference of the braked wheel was somewhat less, indicating a certain amount of slippage. The two recorded pressures increased together since the inlet valve was open. At time $t_{40}$ the deceleration of the wheel had become so great that the preliminary contact $D_1$ responded for a moment, and then stayed closed from time $t_{41}$ on. The inlet valve thus received a potential and closed. Consequently, the brake pressure P failed to increase further. Rather, after a few fluctuations, the P curve changed to a horizontal line.

At time $t_{42}$ the retard mechanism had permitted the driven member to rotate to such an extent that it flipped the rocker arm to the right and closed the deceleration contact $D_2$. This caused the outlet valve to open and allowed the brake pressure to fall. As a result, the wheel speed curve turned upward and began to rise again.

Shortly after the curve $V_w$ began clearly to ascend and a rotational acceleration was present, the outlet valve closed again at $t_{43}$, causing the brake pressure to remain substantially constant. Under more exact review of the oscillogram, a very slight increase in pressure, which was caused by flow through the choke 10 illustrated in FIG. 3, can be easily discerned. The inlet valve continued to remain closed since, in the meantime, the acceleration contact A had taken over the excitation of this valve.

At time $t_{44}$ the rotational acceleration had become so great that the acceleration contact momentarily opened after wiping past the contact spring 72. The brake pressure thus moved up a step, accompanied by the unavoidable fluctuations.

At time $t_{45}$ the speed of the wheel had exceeded its maximum. The driven member of the sensor was therefore neither subjected to a rotational deceleration nor to a rotational acceleration but moved, rather, to its center position. The inlet valve opened allowing the brake pressure to rise with fluctuations and, thereafter, closed momentarily twice more, presumably because the preliminary contact $D_1$ twice closed the circuit. The reason for the closing of the contact $D_1$ can be traced to the two small dips in the speed of the wheel which can be seen at these points, i.e., the two short rotational decelerations.

At time $t_{46}$ a new control cycle began. At this moment, the inlet valve closed again, at first maintaining the brake pressure at a constant level. The rotational deceleration of the wheel continued to increase, however, the retard mechanism of the driven member of the sensor determining the time $t_{47}$ when the outlet valve opened and the pressure dropped. The pressure continued then to fall until the curve $V_w$ for the speed of the wheel turned clearly upward. After two "relocations" of the pressure level, beginning at times $t_{48}$ and $t_{49}$ respectively, the wheel again reached its maximum speed. From time $t_{50}$ on, the driven member of the sensor was at its center position thus completing this control cycle.

At time $t_{51}$ the preliminary contact $D_1$ closed because the rotational deceleration exceeded the threshold value again. At this moment the fluctuations in the brake pressure had not yet ceased, but it can be seen from the graph that the curve as a whole was no longer on the rise. The momentary opening of the preliminary contact at time $t_{52}$ was caused by shock or vibration and need not be considered.

At time $t_{53}$ the outlet valve opened again and the pressure fell. At time $t_{54}$ the outlet valve closed, but a short time thereafter it opened again. This event can be explained by the fact that the brake pressure had not yet fallen low enough so that the wheel was not yet being continuously accelerated. The curve for the speed of the wheel remained horizontal for a short time beginning at $t_{54}$. The deceleration contact $D_2$ thus could open for a short time, but the rocker arm did not flip past its dead center. The rocker arm was not able to flip until $t_{55}$, after which time the outlet valve finally remained closed. Thereafter, the brake pressure again increased in two easily discernible stages, the first probably being caused by a particularly strong rotational acceleration and the second by a decrease in the rotational acceleration below the threshold actuation value of the A contact.

The precontrol pressure $P_v$ in the meantime had risen to its maximum value of approximately 150 atmospheres; as this high brake pressure indicates, this test was undertaken with full braking action; i.e., the driver depressed the brake pedal with full force. The individual increases in the brake pressure P naturally produced fluctuations in the precontrol pressure $P_v$; these can also be recognized in the oscillogram.

In order to more clearly indicate the operation of the escapement retard mechanism according to the present invention, the delay interval T is indicated for each one of the individual control cycles. This delay interval extends in each case, from the moment of closing of the preliminary contact $D_1$ to the moment of closing of the deceleration contact $D_2$. In this case, T is not a constant, but it depends on the rate of decrease of the speed $V_w$ at the circumference of the wheel. The speed differential $\Delta v$ which appears during the respective intervals T is approximately the same, however, in each case.

As a result of such a determination of the moment of pressure reduction, the oscillation of the circumferential speed of the wheel is not only relatively uniform but also of very small amplitude. This is of important significance in the art since, in the modern systems for preventing locking, it is desired not only that the wheels be kept from locking, but also that the braking action be maintained at an optimum value. Thus any great deviation from the theoretical optimum wheel speed is to be avoided.

The sensor according to FIGS. 9 to 13 can also handle some extraordinary situations during controlled braking action which are not shown in FIG. 15. These cases will be discussed individually below. It could have happened, for example, that shortly after time $t_{43}$ at which the outlet valve reclosed, the wheel reached a slippery spot on the road and thus began again to decelerate sharply. Since, at this moment, the speed of the wheel was shortly past its minimum, there would be an increased danger that the wheel might lock. On the other hand, at this moment the retard mechanism had not yet returned to its original position so that the driven member of the sensor would find no impediment to its renewed movement in the deceleration direction. The rocker arm would thus immediately flip to the right again and the brake pressure P be further reduced. The mechanical sensor is thus able to counteract this increased danger of locking without interposing any delay.

If a longer period had elapsed since time $t_{43}$ during which the retard mechanism had returned, say, half-way to its initial position, the driven member could have traversed at least the first part of its movement without being slowed by the member 80. The pressure reduction would then still have begun before expiration of the entire delay interval, or in other words, before the entire speed differential $\Delta v$ had been traversed.

It could also have happened that, after the pressure reduction, the speed of the braked wheel increased only slowly. Thus, for a certain time, the wheel would be in an unstable state of uniform rotational speed which could be followed either by a rotational acceleration or a rotational deceleration. If, during this time, the retard mechanism returned again to its original position, it would no longer be possible to initiate a pressure reduction without a time delay. Since such a pressure reduction might still be necessary, the blocking lever 92 is here employed to block the retard mechanism until the driven member is influenced by a rotational acceleration which is sufficient to reset the blocking lever.

Figure 16:
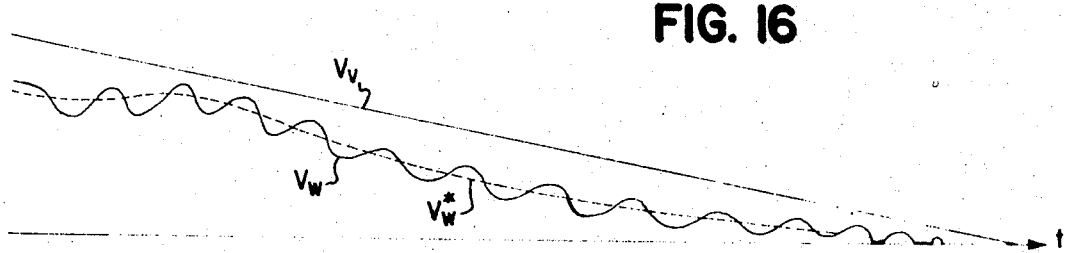
FIG. 16 is a graph of the time response of the wheel and vehicle speeds graphed in FIG. 15 in reduced scale during an entire braking operation.

A further very advantageous property of the system for preventing wheel locking according to the present invention, will now be explained with reference to FIG. 16, which shows the speed $V_v$ of the vehicle and the speed $V_w$ of the wheel in the course of a complete process of braking. The curve $V_w^*$ drawn in broken lines is, so to speak, the mean value of the speed of the wheel and, at the same time, the optimum speed of the wheel. This is best calculated in terms of the speed of the vehicle so that the so-called "optimum slip"

$$s^* = \frac{V_v - V_w^*}{V_v}$$

will result. $s^*$ however, is not a constant value but depends, in addition to the type of tire, the condition of the tire, and the quality of the roadway surface, on two important factors: namely the speed of the vehicle $V_v$ and the lateral guide force or the transverse force Q applied to the wheel.

Figure 18:
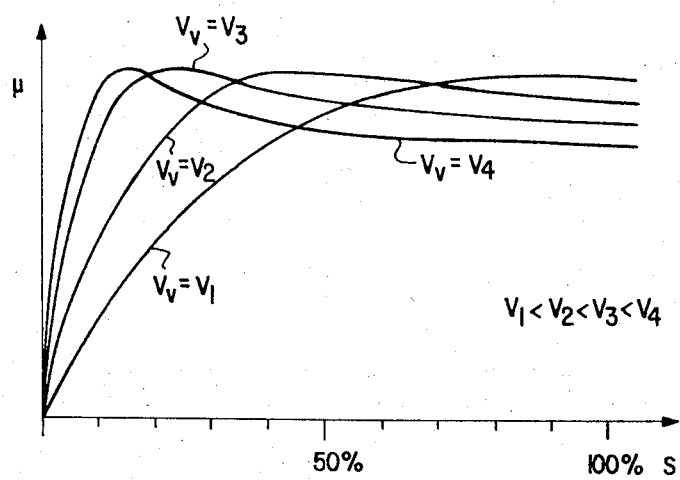
FIG. 18 is a typical friction-slip diagram for a motor vehicle tire.

FIG. 18 shows four characteristic curves representing the frictional coefficient $\mu$ for different valves of the slip $s$. These $\mu$—$s$ curves apply to four different vehicle speeds $v_1$, $v_2$, $v_3$ and $v_4$. To be specific, $v_1$ is assumed to be 20 km./hr. and $v_4$=140 km./hr. The other speeds fall in between. It can be seen in this figure that at high vehicle speeds the frictional value $\mu$ and thus the braking action has a defined maximum. At slower speeds, the maximum is not as clearly defined and is also displaced toward the right. At very low vehicle speeds, the maximum can often no longer be recognized; at these speeds the greatest braking action is obtained when the wheels are locked. Thus, when a vehicle is being braked from a high speed to a standstill, the optimum slip increases, i.e., the slip at a maximum $\mu$ increases from 15% to 100%. If this analysis is transferred to FIG. 16, the optimum wheel speed will appear as a drooping curve which begins at the upper left corner with a valve close to the vehicle speed and asymptotically approaches the time axis at the lower right.

Figure 17:
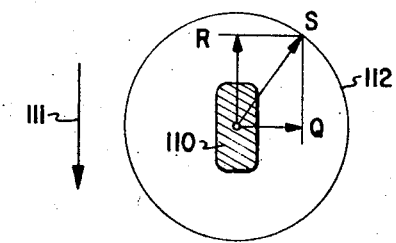
FIG. 17 is a vector diagram showing the forces which act on a vehicle wheel.

However, further consideration must also be given to the influence of the transverse force Q on the optimum slip. FIG. 17 shows, in the hatched region, the contact surface 110 of an automobile tire on a roadway. This is the area through which the forces act between roadway and wheel. An arrow 111 indicates the direction of movement of the vehicle. When this vehicle is braked during a curve to the right, the wheel is affected, on the one hand, by a transverse force Q and on the other by the braking force R. The victor sum of both forces together is shown as the total force S. The limit value of this total frictional force is principally independent of the direction of force. The wheel thus remains stable with reference to lateral forces as long as the force S remains within the so-called "starting friction limit circle" 112.

If it is assumed that the vehicle is driving through a curve and thus a relatively large transverse force (which, however, still lies within the starting friction limit circle) is acting on the wheel, only a small component of braking force may be applied if the wheel is not to laterally break loose. This braking force must therefore be substantially smaller, under these circumstances, than the braking force realizable when driving straight ahead. A smaller acceptable braking force is, however, the same as a low friction coefficient $\mu$ in the direction of vehicle movement and thus, according to FIG. 18, synonymous with a reduced slip $s$.

Of necessity, therefore, the optimum slip $s^*$, which represents, so to speak, the desired nominal value of the control system described here, must be smaller when driving through sharp curves than when driving straight ahead. This principle also applied when, during the braking action, the driver of the vehicle tries to evade an obstacle on an otherwise straight stretch of road. This case is illustrated in the left half of FIG. 16 where the curve $V_w^*$ bulges upward toward the curve $V_v$. Here a lateral force has acted on the braked wheel, and the brake control system has reduced the slippage automatically.

This characteristic of being able to quickly determine, from the rotational decelerations and accelerations of the wheel, any deviation of the actual speed of the wheel $V_w$ from the desired speed $V_w^*$ and to initiate appropriate countermeasures makes the system according to the present invention, an especially effective safeguard against skidding in a curve. Thus, with the natural limitation that the brake control system can be effective only if the vehicle speed itself is not so great that the vehicle would skid even without application of the brakes, the system, according to the present invention, has the capability of automatically achieving the best possible braking action under *any* circumstances—even circumstances which include the appearance of transverse forces at the braked wheel.

The particular feature of the present invention described above, wherein the reduction in pressure is not initiated until the circumferential speed of the wheel has fallen by a certain amount $\Delta v$, will be called the "$\Delta v$-filtering" in the description that follows. This feature is not limited to the case where the pressure reduction is initiated by a deceleration signal. Rather the $\Delta v$ filtering is of general significance to the brake control systems art.

Thus a system for preventing wheel locking may be constructed, for example, to operate essentially as the systems described in the preceding embodiments with respect to the switching moments of the valves, but to derive at least the first initiating signals of its control cycle ("pressure constant" and "pressure falling") from a simple measurement of the speed at the circumference of the wheel. For this purpose a first measured value which is proportional to the speed $V_w$ at the circumference of the wheel is compared with a second measured value which is equal to the first measured value in steady state but which follows variations in the first value slowly (strongly attenuated) in one direction and quickly (unattenuated) in the other. The brake control valves are then operated whenever the difference in the measured values exceeds a certain limit value or threshold.

Figure 19:
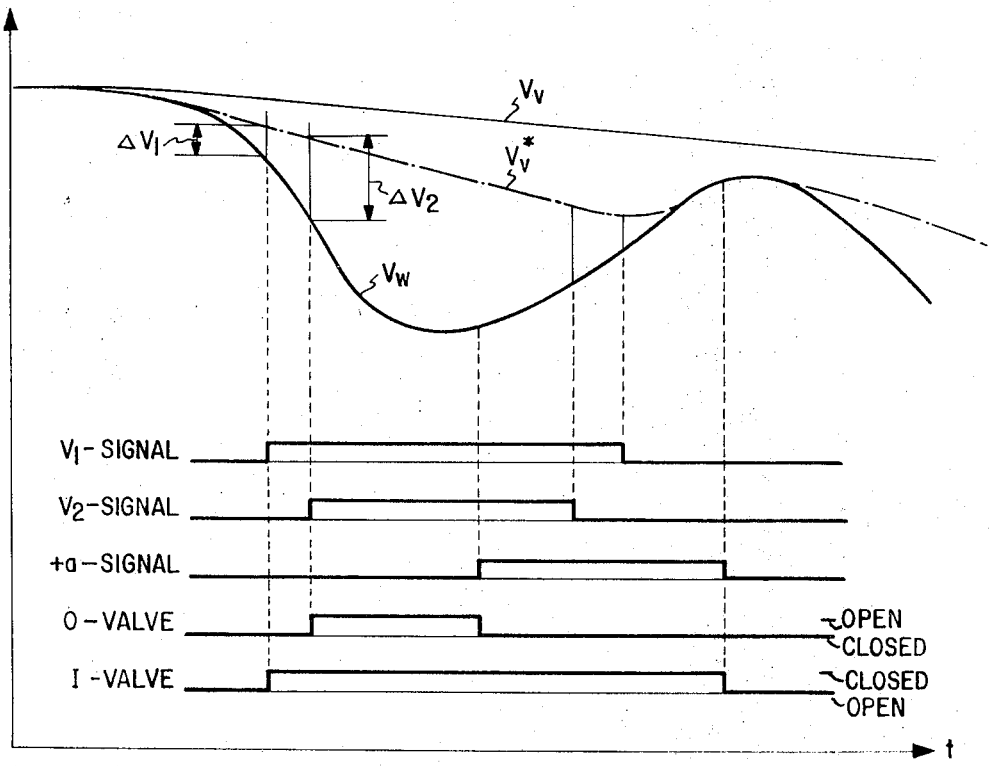
FIG. 19 is a graph showing an exemplary time response of a further embodiment of the brake control system according to the present invention. In this embodiment, the reduction in pressure is delayed until the circumferential speed of the wheel has fallen by a prescribed amount.

The top part of FIG. 19 shows a graph of the vehicle speed $V_v$ and the speed $V_w$ at the circumference of the wheel. The dot-dashed line $V_v^*$ designates the speed represented by the second measured value—a kind of artificial "vehicle speed" which, however, is not obtained from an unbraked wheel but derived from the speed at the circumference of the braked wheel.

$V_w$ and $V_v^*$ are continuously compared with each other in a suitable device. As soon as the difference exceeds a certain value $\Delta v_1$, the device produces a first signal; when the difference exceeds a second predetermined value $\Delta v_2$, the device produces a second signal. The length of these signals may be seen in the lower part of FIG. 19. In particular, each signal lasts until the difference becomes smaller again than its respective difference value.

In the illustrated control cycle only the leading, or positively increasing edges of the signals are utilized. The leading edge of the $\Delta v_1$-signal closes the inlet valve and the leading edge of the $\Delta v_2$-signal opens the outlet valve.

A measurement of the acceleration of the brake wheel results, finally in the illustrated $+a$-signal. Its leading edge closes the outlet valve again and its trailing edge opens the inlet valve at the end of the control cycle.

FIG. 10 shows a shaft 115 which is connected to be driven by, or coupled with the braked wheel. Two radially movable masses 116 and 117 are disposed on the shaft in the manner of a centrifugal governor. They are pulled by springs 118 and 119 into the position nearest to the rotational axis of shaft 115. Mass 117 is disposed on a rod 120 which in guided is sliding bearings 121. This mass move unhindered, so that its radial distance from the axis of the shaft is a direct measure of the speed $V_w$ at the circumference of the wheel. The other mass 116 is disposed on a rod 122 which extends into a damping cylinder 123. At the end of the rod 122 is a piston ring 125 attached by means of a yoke or bracket 124. This ring is shown in section. On the opposite side of the ring is a second yoke 128 to which the tension spring 118 is fastened. The ring opening is covered at the bottom by a flap 126; this flap is pressed very lightly thereon by a spring 127. The entire arrangement 124 to 128 ensures that radial movements of the mass 116 will occur practically unattenuated in the direction away from the rotational axis but sharply attenuated in the direction toward the rotational axis. If the mass move away from the axis, flap 126 will open, allowing the damping medium to enter through the center of the ring; when the mass moves in the opposite direction the flap will close. Two springs with contact beads 130 are disposed on, but insulated from, both the masses. When these two contact beads come in contact with each other they initiate the Δv-signal.

The device shown in FIG. 20 operates as follows: If the rotational speed of the shaft 115 decreases slowly from a constant value, both masses 116 and 117 will move toward the shaft at the same speed. The contact beads 130 will therefore not come together to close a circuit. If, however, the rotational speed falls sharply, as shown in FIG. 19, the mass 117 will move faster toward the shaft than the mass 116 due to the attenuation of the latter and, depending on the spacing of the contact beads, they will generate the Δv-signal at a certain predetermined time. If the rotational speed increases either slowly or fast, the mass 117 will be the first to move outward, since its spring 119 provides less tension than the spring 118; the signal contact will then open again. As soon as the mass 117 has reached the same position as mass 116, both masses will move outward together since, in this direction, the conditions of attenuation are the same. This permits the next Δv-signals to again be determined by the particular previous maximum of the speed $V_w$ at the circumference of the wheel.

Figure 21:
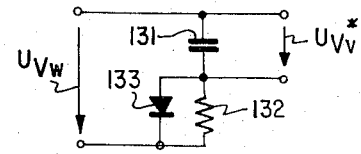
FIG. 21 is a schematic diagram of an electric circuit which may be used to obtain a reference value for the embodiment associated with FIG. 19.

FIG. 21 illustrates a four-terminal electrical network which receives at its input, a voltage $U_{V_w}$ proportional to speed of the wheel and produces, at its output, a voltage $U_{V_v}{}^*$ representing the second measured value. A capacitor 131 is connected in series with a resistor 132 and the output voltage obtained across the capacitor. A diode 133 is provided in parallel with the resistor 132. If, in this circuit, the voltage $U_{V_w}$ increases either slowly or rapidly, the capacitor will be charged directly through the diode 133 so the capacitor voltage $U_{V_v}{}^*$ will increase at the same rate. If $U_{V_w}$ falls, however, the capacitor can discharge only through resistor 132, since the diode will be biased in the reverse direction. If $U_{V_w}$ falls slowly, enough discharge current will flow through the resistor to prevent a noticeable difference between the input voltage and the output voltage of the four-terminal network. If, however, $U_{V_w}$ falls very rapidly, $U_{V_v}{}^*$ will lag behind.

Figure 22:
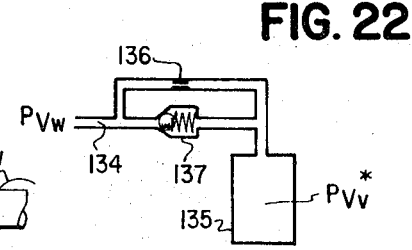
FIG. 22 is a schematic diagram of hydraulic apparatus for obtaining a reference value in the embodiment associated with FIG. 19.

FIG. 22 shows a pressure line 134 having two tubular branches leading to a pressure container 135. A choke or constriction 136 is built into one branch and a one-way or check valve 137 directed to permit flow to the pressure container disposed in the other. It is assumed in this case that the speed at the circumference of the wheel is represented by a pressure $P_{V_w}$. The second measured value is then given by the pressure the pressure $P_{V_v}{}^*$ in the container. As with the electrical network described above, it can be easily seen that the container pressure $P_{V_v}{}^*$ will quickly follow each rise in the input pressure $P_{V_w}$. On the other hand, since a flow of the pressure medium out of the container is possible only through the choke 136, when the input pressure decreases rapidly, the container pressure will follow only very slowly.

Figure 20:
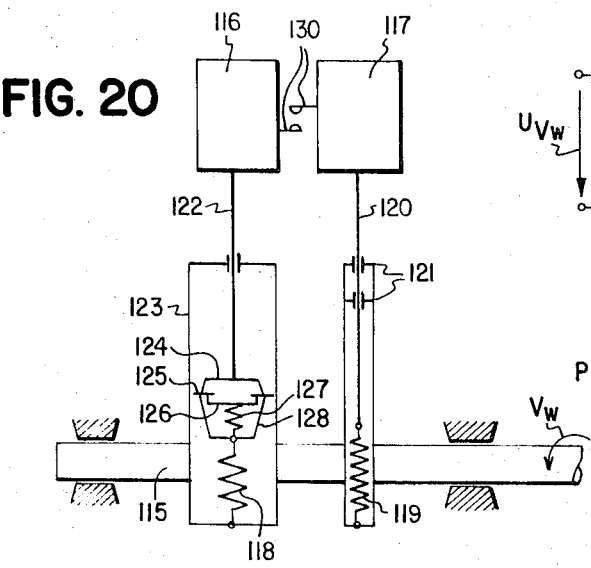
FIG. 20 is a mechanical model illustrating the embodiment associated with FIG. 19.

The mechanical device of FIG. 20, the electrical device of FIG. 21 and the pneumatic device of FIG. 22 may all be used to derive the signal $V_v{}^*$ from the given speed of the wheel $V_w$. As shown in FIG. 20, it is then a simple matter to generate an electrical signal when the difference between the signals $V_v{}^*$ and $V_w$ exceeds a first or a second threshold ($\Delta v_1$ and $\Delta v_2$).

Although the mechanical device of FIG. 20 includes only one pair of contacts, which close an electrical circuit when the quantity $V_v{}^* - V_w$ exceeds a given value, it should be clear that a second electrical circuit may also be closed when $V_v{}^* - V_w$ exceeds a second value by providing a second pair of contacts, spaced appropriately far apart. Both pairs of contacts should be sufficiently flexible so that, when closed, they do not interfere with the otherwise normal movements of the masses 116 and 117.

The two Δv signals may also be produced electrically, from the input and output signals of the device of FIG. 21, in the manner shown in FIG. 5. The input signal $U_{V_w}$ is first subtracted from the output signal $U_{V_v}{}^* - U_{V_w}$ and then this difference signal is compared, in two sum-and-difference amplifiers, with two battery-generated threshold voltages, $\Delta v_1$ and $\Delta v_2$. Thus, as in the case of the amplifiers 25 and 26 in FIG. 5, an output signal will be produced if and only if the difference signal exceeds these respective voltages.

Finally, the corresponding Δv signals may be produced using the pneumatic device of FIG. 22 by applying the pressure $P_{V_w}$ to one side and the pressure $P_{V_v}{}^*$ to the other side of a movable diaphragm of two appropriately constructed pressure switches. The switches may be designed to close an electrical circuit when the pressure difference exceeds a prescribed first and second value ($\Delta v_1$ and $\Delta v_2$).

It should be noted, finally, that the signal which closes the outlet valve again after the reduction in brake pressure can also be derived through the Δv filtering. This merely requires a device for deriving measured value that rapidly follows any drops in the speed at the circumference of the wheel but which only slowly follows an increase in this speed. It is thus only necessary to connect the devices described above, in connection with FIGS. 20–22, the other way around. The resulting signals are then an indication that the minimum of the speed at the circumference of the wheel has been definitely traversed each time.

It will be understood that the above description of the present invention is susceptible to various modifications, changes, and adaptations.

I claim:

1. A brake control ssytem for preventing wheel locking suitable for use with a vehicle having brakes actuated by a pressure medium, comprising in combination:
   (a) first means for sensing and for producing a first output signal when the rotational deceleration of a wheel of such vehicle exceeds a given threshold value; and
   (b) second means connected to receive said first output signal for reducing the braking force applied to such wheel a prescribed delay time after receipt of said first output signal, said second means including means connected to receive said first output signal for producing a second output signal said prescribed delay time after receipt of said first output signal, and means connected to receive said second output signal for reducing the braking force applied to such wheel after receipt of said second output signal, said means for producing said second output signal being an electronic time delay element and said prescribed time delay having a fixed value.

2. A brake control system for preventing wheel locking suitable for use with a vehicle having brakes actuated by a pressure medium, comprising in combination:
   (a) first means for sensing and for producing a first output signal when the rotational deceleration of a wheel of such vehicle exceeds a given threshold value; and
   (b) second means connected to receive said first output signal for reducing the braking force applied to such wheel a prescribed delay time after receipt of said first output signal, said second means including means connected to receive said first output signal for producing a second output signal said prescribed delay time after receipt of said first output signal, and means connected to receive said second output signal for reducing the braking force applied to such wheel after receipt of said second output signal, said second means including means for varying said delay time, said varying means being operative to make said delay time shorter, the faster the rotational speed of the wheel is reduced.

3. A brake control system for preventing wheel locking suitable for use with a vehicle having brakes actuated by a pressure medium, comprising in combination:
   (a) first means for sensing and for producing a first output signal when the rotational deceleration of a wheel of such vehicle exceeds a given threshold value; and (b) second means connected to receive said first output signal for reducing the braking force applied to such wheel a prescribed delay time after receipt of said first output signal, said second means including means connected to receive said first output signal for producing a second output signal said prescribed delay time after receipt of said first output signal, and means connected to receive said second output signal for reducing the braking force applied to such wheel after receipt of said second output signal, said second means including means for varying said delay time, said varying means being operative to make said delay time shorter, the shorter the time since the braking force applied to the wheel was previously reduced.

4. A brake control system for preventing wheel locking suitable for use with a vehicle having brakes actuated by a pressure medium, comprising in combination:

(a) first means for sensing and for producing a first output signal when the rotational deceleration of a wheel of such vehicle exceeds a given threshold value; and (b) second means connected to receive said first output signal for reducing the braking force applied to such wheel a prescribed delay time after receipt of said first output signal, said second means including means for cancelling said delay time, said cancelling means being operative to reduce said delay time to zero unless the wheel attains a prescribed threshold value of rotational acceleration after the previous reduction in the braking force applied thereto.

5. A brake control system for preventing wheel locking suitable for use with a vehicle having brakes actuated by a pressure medium, comprising in combination:

(a) first means for sensing and for producing a first output signal when the rotational deceleration of a wheel of such vehicle exceeds a given threshold value; and (b) second means connected to receive said first output signal for reducing the braking force applied to such wheel a prescribed delay time after receipt of said first output signal, said second means including means for terminating said delay time, said terminating means being operative to initiate the application of the braking force to the wheel when the rotational speed of the wheel has been reduced to a value a prescribed quantity $\Delta v$ less than its rotational speed at the time of receipt of said first output signal.

6. A brake control system for preventing wheel locking suitable for use with a vehicle having brakes actuated by a pressure medium, comprising in combination:

(a) first means for sensing and for producing a first output signal when the rotational deceleration of a wheel of such vehicle exceeds a given threshold value, said first means including means for producing a second output signal at least approximately proportional to the rotational deceleration of such wheel; and (b) second means connected to receive said first output signal for reducing the braking force applied to such wheel a prescribed delay time after receipt of said first output signal, said second means including integration means, connected to receive said first and said second output signals, for integrating said second output signal after receipt of said first output signal and for reducing said braking force when the integral of said second output signal attains a prescribed quantity.

7. A brake control system for preventing wheel locking suitable for use with a vehicle having brakes actuated by a pressure medium, comprising in combination:

(a) first means for sensing and for producing a first output signal when the rotational deceleration of a wheel of such vehicle exceeds a given threshold value, said first means including means for producing a second output signal at least approximately proportional to the rotational speed of such wheel; and (b) second means connected to receive said first output signal for reducing the braking force applied to such wheel a prescribed delay time after receipt of said first output signal, said second means including means, connected to receive said first and second output signals, for storing the value of said second output signal upon receipt of said first output signal and comparison means, connected to said storing means and to receive said second output signal, for reducing said braking force when the difference between value of said second output signal and the stored value exceeds a prescribed quantity.

8. A brake control system for preventing wheel locking, suitable for use with a vehicle having brakes actuated by a pressure medium, comprising, in combination:

(a) sensor means having a drive member connected to be rotated by a wheel to be braked; a driven member, connected to be rotated by said drive member, said driven member being arranged to rotate in one direction relative to said drive member, upon deceleration of such wheel and to rotate in the opposite direction relative to said drive member, upon acceleration of such wheel; contact means for producing a first output signal when said driven member rotates a prescribed angular distance, relative to said drive member, in said one direction; and means for damping the rotation of said driven member, relative to said drive member, in said one direction; and (b) means, connected to receive said output signal, for reducing the braking force applied to such wheel after receipt of said output signal.

9. The apparatus defined in claim 8, wherein said damping means includes an escapement retard mechanism, said mechanism being arranged to be driven away from a normal position by a follower on said driven member when said driven member rotates in said one direction and to be returned to said normal position by a return spring.

10. The apparatus defined in claim 9, wherein said damping means further includes lever means for selectively blocking the movement of said escapement retard mechanism, said lever means being arranged to be moved into the blocking position by a follower on said driven member when said driven member has rotated a prescribed distance in said one direction and to be moved out of the blocking position by a follower on said driven member when said driven member has rotated a prescribed distance in said opposite direction.

11. A brake control system for preventing wheel locking, suitable for use with a vehicle having brakes actuated by a pressure medium, comprising, in combination:

(a) first means, connected to a wheel to be braked, for producing a first signal at least approximately proportional to the rotational speed of such wheel;

(b) second means, connected to said first means, for producing a second signal which is proportional to said first signal steady state and which slowly follows changes in said first signal in one direction and quickly follows changes in said first signal in the opposite direction;

(c) third means, connected to said first and said second means, for producing a first output when the difference between said first and said second signals exceeds a first prescribed value; and (d) fourth means, connected to receive said first output for controlling the braking force applied to such wheel in response to receipt of said first output.

12. The apparatus defined in claim 11, wherein said one direction is the direction corresponding to a falling rotational speed of such wheel; wherein said third means is further operative to produce a second output when the difference between said first and said second signals exceeds a second prescribed value, said second value being greater than said first value; and wherein said fourth means includes inlet valve means for controlling the flow of pressure medium to the brake of such wheel, outlet valve means for controlling the flow of pressure medium away from the brake of such wheel and fifth means, connected to receive said first and said second outputs for closing said inlet valve means in response to receipt of said first output and opening said outlet valve means in response to receipt of said second output.

References Cited

UNITED STATES PATENTS

| | | | |
|---|---|---|---|
| 3,245,727 | 4/1966 | Anderson et al. | 303—21(A4) |
| 3,398,995 | 8/1968 | Martin | 303—21(A4) |
| 3,402,972 | 9/1968 | Cooper et al. | 303—20 |

DUANE A. REGER, Primary Examiner

U.S. Cl. X.R.

303—20